US009253344B2

(12) United States Patent
Utsumi

(10) Patent No.: US 9,253,344 B2
(45) Date of Patent: Feb. 2, 2016

(54) JOB PROCESSING APPARATUS, METHOD FOR CONTROLLING THE SAME, AND STORAGE MEDIUM

(75) Inventor: Keiko Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 12/419,948

(22) Filed: Apr. 7, 2009

(65) Prior Publication Data

US 2009/0323102 A1 Dec. 31, 2009

(30) Foreign Application Priority Data

Apr. 8, 2008 (JP) ................................ 2008-100325

(51) Int. Cl.
*G06F 3/12* (2006.01)
*H04N 1/00* (2006.01)

(52) U.S. Cl.
CPC ....... *H04N 1/00413* (2013.01); *H04N 1/00411* (2013.01); *H04N 1/00474* (2013.01); *H04N 1/00482* (2013.01); *H04N 1/00928* (2013.01); *H04N 2201/0094* (2013.01)

(58) Field of Classification Search
CPC .......... H04N 1/00411; H04N 1/00413; H04N 1/00482; H04N 1/00928; H04N 1/00474; H04N 2201/0094
USPC ................................ 358/1.13–1.16; 715/700
See application file for complete search history.

(56) References Cited

U.S. PATENT DOCUMENTS

| | | | | |
|---|---|---|---|---|
| 5,467,434 A * | 11/1995 | Hower, Jr. | ............. | G06F 3/1205 358/1.13 |
| 6,045,206 A * | 4/2000 | Igval | ......................... | B41J 2/01 347/19 |
| 6,067,618 A * | 5/2000 | Weber | ..................... | G06F 9/441 713/1 |
| 6,246,485 B1 * | 6/2001 | Brown | ................... | H04L 41/082 358/1.13 |
| 6,597,378 B1 * | 7/2003 | Shiraishi | ............... | G06F 3/0481 715/733 |
| 6,611,850 B1 * | 8/2003 | Shen | .................... | G06F 11/1448 |
| 6,621,508 B1 * | 9/2003 | Shiraishi | ............... | G06F 3/0481 715/764 |
| 6,661,438 B1 * | 12/2003 | Shiraishi | ............... | G06F 1/1626 715/781 |
| 6,665,098 B1 * | 12/2003 | Nagarajan | ............ | H04N 1/0035 358/474 |
| 6,809,724 B1 * | 10/2004 | Shiraishi | ................. | G06F 1/163 345/157 |
| 7,199,886 B2 * | 4/2007 | Brandl | ............... | G06K 15/1805 358/1.1 |
| 7,706,003 B2 * | 4/2010 | Uruma | ......................... | 358/1.14 |
| 7,750,676 B2 * | 7/2010 | Kaizu | ................. | G06F 11/1068 326/10 |
| 7,822,834 B2 * | 10/2010 | Kawai | .................... | G06F 3/1204 709/220 |

(Continued)

FOREIGN PATENT DOCUMENTS

JP 2006-259873 A 9/2006

*Primary Examiner* — Ted Barnes
(74) *Attorney, Agent, or Firm* — Canon USA, Inc. IP Division

(57) ABSTRACT

A job processing apparatus includes a display unit that displays a job setting screen for receiving a job setting, an obtaining unit for obtaining information indicating a configuration of the job processing apparatus after the job processing apparatus is started, and a display control unit that causes the display unit to display a first job setting screen before the obtaining unit obtains the information indicating the configuration of the job processing apparatus. The display control unit causes, after the obtaining unit obtains the information indicating the configuration after the job processing apparatus is started, the display unit to display a second job setting screen based on the obtained information indicating the configuration. The display control unit also causes the display unit to display the second job setting screen which has taken over setting of a job via the first job setting screen.

27 Claims, 15 Drawing Sheets

(56) References Cited

U.S. PATENT DOCUMENTS

| | | | | |
|---|---|---|---|---|
| 7,903,273 B2* | 3/2011 | Tashiro | H04N 1/00411 | 358/1.13 |
| 7,948,643 B2* | 5/2011 | Aritomi | G06F 3/1203 | 358/1.13 |
| 8,049,914 B2* | 11/2011 | Tashiro | G03G 15/5016 | 348/569 |
| 8,164,771 B2* | 4/2012 | Hikichi | G06F 21/608 | 358/1.13 |
| 8,180,133 B2* | 5/2012 | Omi | G06T 7/0083 | 378/4 |
| 8,245,907 B2* | 8/2012 | Liang | B41J 3/44 | 235/375 |
| 8,446,605 B2* | 5/2013 | Takahashi | G06K 15/1859 | 358/1.1 |
| 8,687,232 B2* | 4/2014 | Saito | H04N 1/00222 | 358/1.15 |
| 8,757,760 B2* | 6/2014 | Tokura | G06F 3/1207 | 347/19 |
| 2004/0039724 A1* | 2/2004 | Stephan | G06F 12/0292 | |
| 2004/0196485 A1* | 10/2004 | Hikichi | G06F 21/608 | 358/1.13 |
| 2006/0206703 A1* | 9/2006 | Kim | G06F 9/4406 | 713/2 |
| 2006/0225038 A1 | 10/2006 | Okabe | | |
| 2006/0250632 A1* | 11/2006 | Tashiro | H04N 1/00411 | 358/1.13 |
| 2006/0268805 A1* | 11/2006 | Kawai | G06F 3/1204 | 370/338 |
| 2007/0118646 A1* | 5/2007 | Gassoway | G06F 21/57 | 709/225 |
| 2007/0176946 A1* | 8/2007 | Matoba | G03G 15/502 | 345/619 |
| 2007/0201092 A1* | 8/2007 | Okutsu | G06F 9/4406 | 358/1.16 |
| 2008/0005319 A1* | 1/2008 | Anderholm | G06Q 10/00 | 709/224 |
| 2008/0151282 A1* | 6/2008 | Natori | G06F 3/1205 | 358/1.9 |
| 2008/0151283 A1* | 6/2008 | Wang | G06F 3/1204 | 358/1.13 |
| 2008/0151316 A1* | 6/2008 | Yoshida | H04N 1/00212 | 358/402 |
| 2008/0246988 A1* | 10/2008 | Ashton | G06F 3/1204 | 358/1.15 |
| 2009/0086255 A1* | 4/2009 | Duong | G06K 15/02 | 358/1.15 |
| 2010/0328698 A1* | 12/2010 | Toriyabe | G06F 3/121 | 358/1.14 |
| 2011/0002001 A1* | 1/2011 | Tokura | G06F 3/1207 | 358/1.14 |
| 2011/0199642 A1* | 8/2011 | Utsunomiya | G03G 15/5062 | 358/1.15 |
| 2012/0086970 A1* | 4/2012 | Takahashi | G06K 15/1859 | 358/1.13 |

* cited by examiner

FIG. 14

901 { 
RESERVED COPY ERROR

SCAN DATA: 5

PRINT DATA: 5×2 SETS

902 {
COPY MODE: MONOCHROME

PRINT PATTERN: AUTO

COPY RATIO: AUTO

PAPER: LETTER ★

SCAN/PRINT PATTERN: ONE-SIDE→TWO-SIDED

NUMBER OF COPIES: 100

903 {
ERROR CONTENT
· A4 PAPER IN SHORT SUPPLY

JOB PROCESSING APPARATUS, METHOD FOR CONTROLLING THE SAME, AND STORAGE MEDIUM

BACKGROUND OF THE INVENTION

1. Field of the Invention

The present invention relates to a job processing apparatus, a method for controlling the same, and a storage medium.

2. Description of the Related Art

A multifunction peripheral (MFP) is conventionally known as an example of a job processing apparatus. When turned ON, a central processing unit (CPU) of the MFP first reads a boot program from a ROM to execute the program in a RAM. The CPU starts initialization processing of an operating system (OS) or spinning-up of a hard disk drive (HDD) by executing the boot program. When the spinning-up of the HDD is completed, so that data can be read from the HDD, the CPU reads a control program from the HDD. Then, the CPU executes the read control program to check what configuration its own apparatus has, and displays a job setting screen for setting jobs based on the checked configuration. Via the job setting screen displayed through such a procedure executed by the CPU, a user can set jobs using the configuration of the MFP.

However, in the case of the conventional job processing apparatus, for example, the spinning-up of the HDD and the checking of the configuration of the apparatus based on the control program read from the HDD may have to be carried out before the job setting screen is displayed and after the apparatus is turned ON. Thus, the user cannot set any jobs via the job setting screen before completion of such processing.

SUMMARY OF THE INVENTION

According to an aspect of the present invention, a job processing apparatus includes a display unit that displays a job setting screen for receiving a job setting, an obtaining unit that obtains information indicating a configuration of the job processing apparatus after the job processing apparatus is started, and a display control unit that causes the display unit to display a first job setting screen before the obtaining unit obtains the information indicating the configuration of the job processing apparatus. The display control unit causes, after the obtaining unit obtains the information indicating the configuration after the job processing apparatus is started, the display unit to display a second job setting screen based on the obtained information indicating the configuration. The display control unit causes the display unit to display the second job setting screen which has taken over setting of a job via the first job setting screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 14 is a schematic diagram illustrating an example of a printed output of an error content of reserved job execution time output from a PRINTER shown in FIG. 1.

DETAILED DESCRIPTION OF THE EMBODIMENTS

Various exemplary embodiments, features, and aspects of the invention will be described in detail below with reference to the drawings.

Figure 1:
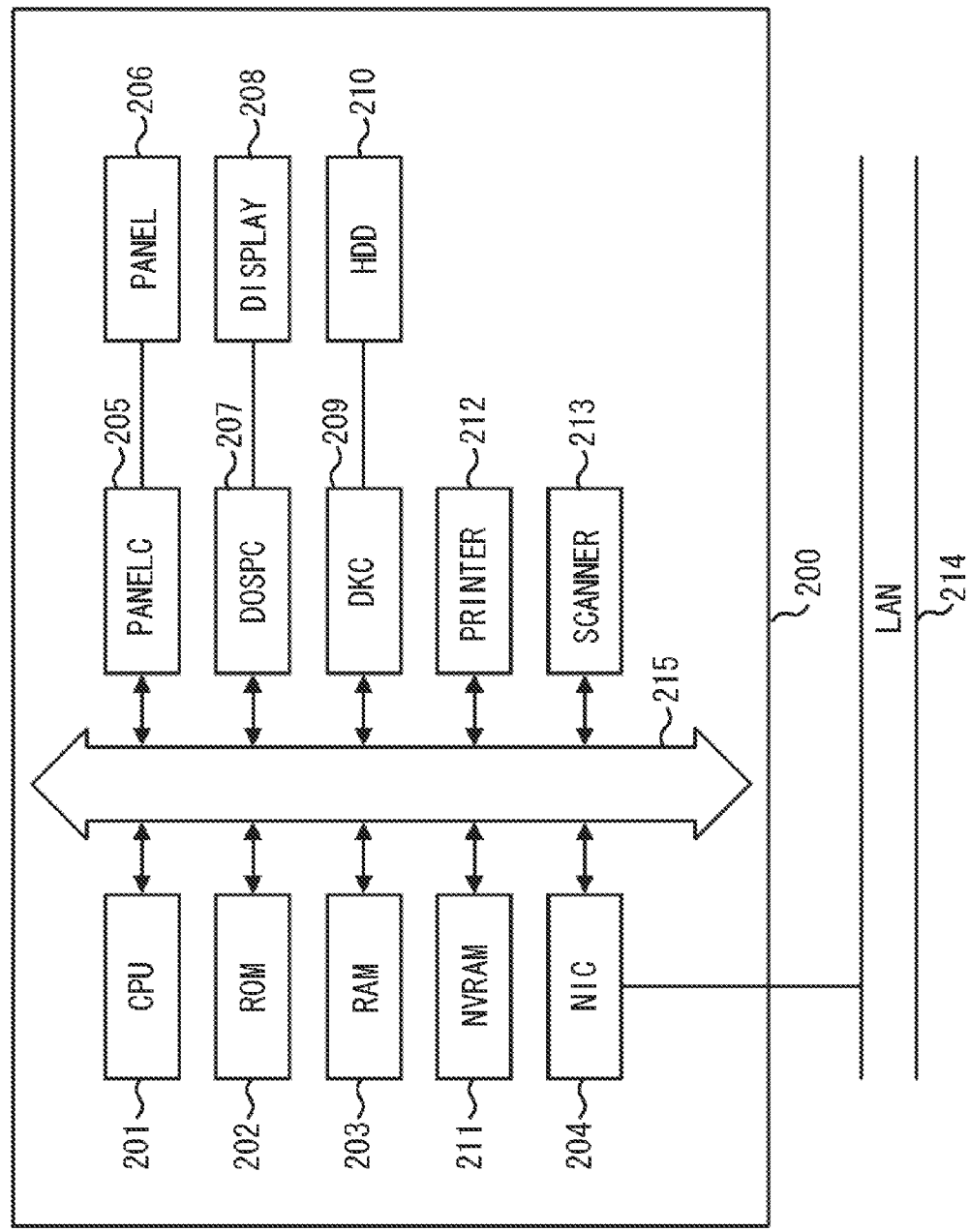
FIG. 1 is a block diagram illustrating a configuration of a MFP according to an exemplary embodiment of the present invention.

FIG. 1 is a block diagram illustrating a configuration of a MFP which is an example of a job processing apparatus according to an exemplary embodiment of the present invention. The exemplary embodiment is directed to an MFP which includes a scanner function, a printer function, a facsimile function, and a data communication function as an example of a job processing apparatus. However, aspects of the present invention may also be applicable to an apparatus which includes, for example, only one of such functions.

In the embodiment shown in FIG. 1, a MFP 200 includes a CPU 201 and a ROM 202. The CPU 201 controls the MFP 200 overall by executing a program stored in the ROM 202.

Figure 2:
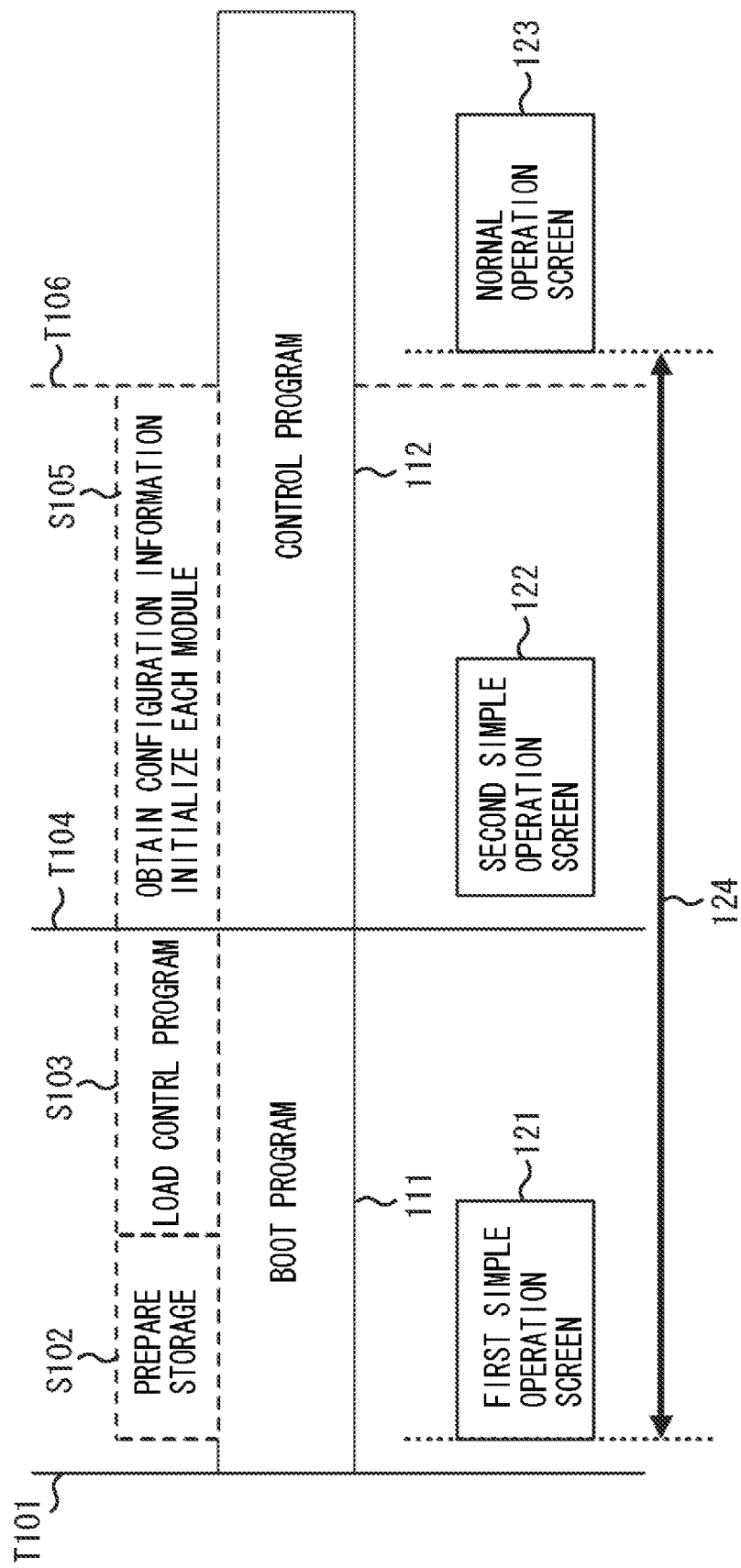
FIG. 2 is a timing chart illustrating an example of start processing of the MFP of the exemplary embodiment.

The ROM 202 is a nonvolatile memory for storing a boot program 111 (e.g., as shown in the example of FIG. 2) to start the MFP 200. The ROM 202 may store various programs such as a control program to control the MFP 200 after the start. These programs may be read into the RAM 203 to be executed by the CPU 201.

The RAM 203 is a volatile memory which functions as a work area of the CPU 201.

A network interface card (NIC 204) is an interface for controlling data communication with an external apparatus via a LAN 214.

An external input controller (PANELC) 205 controls an entry from an operation panel (PANEL) 206 which includes various hard buttons or touch panels disposed in the MFP 200.

A display controller (DOSPC) 207 controls displaying in a display device (DISPLAY) 208 which may include, for example, a liquid crystal display or a projector.

According to this embodiment, the PANEL 206 and the DISPLAY 208 may be integrally configured. The user may press a position of the PANEL 206 corresponding to an operation key displayed in the DISPLAY 208 to instruct the MFP 200 to perform an operation. The CPU 201 detects the position of the PANEL 206 pressed by the user to execute a command corresponding to the detected position. In the exemplary embodiment, the PANEL 206 and the DISPLAY 208 constitute an operation unit. In other words, the MFP 200 can receive job setting from the user via the operation unit, and display set contents. The MFP 200 may include a plurality of display units (DISPLAY) 208.

A disk controller (DKC) 209 controls data input/output to and from a HDD 210 (storage device). The HDD 210 functions as a large-capacity storage device, and stores a control program 112 (e.g., as shown in the example of FIG. 2) according to the exemplary embodiment. The HDD 210 starts spinning-up by a command from the CPU 201 at the time of starting the MFP 200, and may notify the CPU 201 when the spinning-up is completed, of the completion. Having been notified of the spinning-up completion of the HDD 210, the CPU 201 may read the control program from the HDD 210 to execute the program.

Due to the relatively large capacity of the control program 112, when a system becomes large-scale to a certain extent, the control program 112 may be stored in the HDD 210 in many cases. A boot program 111 may be recorded in a boot ROM 202, which may be a nonfailed silicon nonvolatile memory device in many cases, since a new HDD (i.e., storage device) may have to be installed to restore the system when the HDD 210 fails.

A printer engine (PRINTER) 212 includes an engine member, and may print image data expanded in the RAM 203. An engine controller in the printer engine 212 may analyze intermediate data to expand it to last image data.

A scanner engine (SCANNER) 213 reads a document set on a document plate. An engine such as the printer engine 212 or the scanner engine 213 may be serially connected to the controller to perform communication.

A nonvolatile memory (NVRAM) 211 may function to store mainly an initial value at start time or a counter value, and management information indicating a state of the MFP 200.

FIG. 2 is a timing chart illustrating an example of start processing of an image processing apparatus according to the exemplary embodiment. This chart shows timings T101, T104, and T106.

Figure 7:
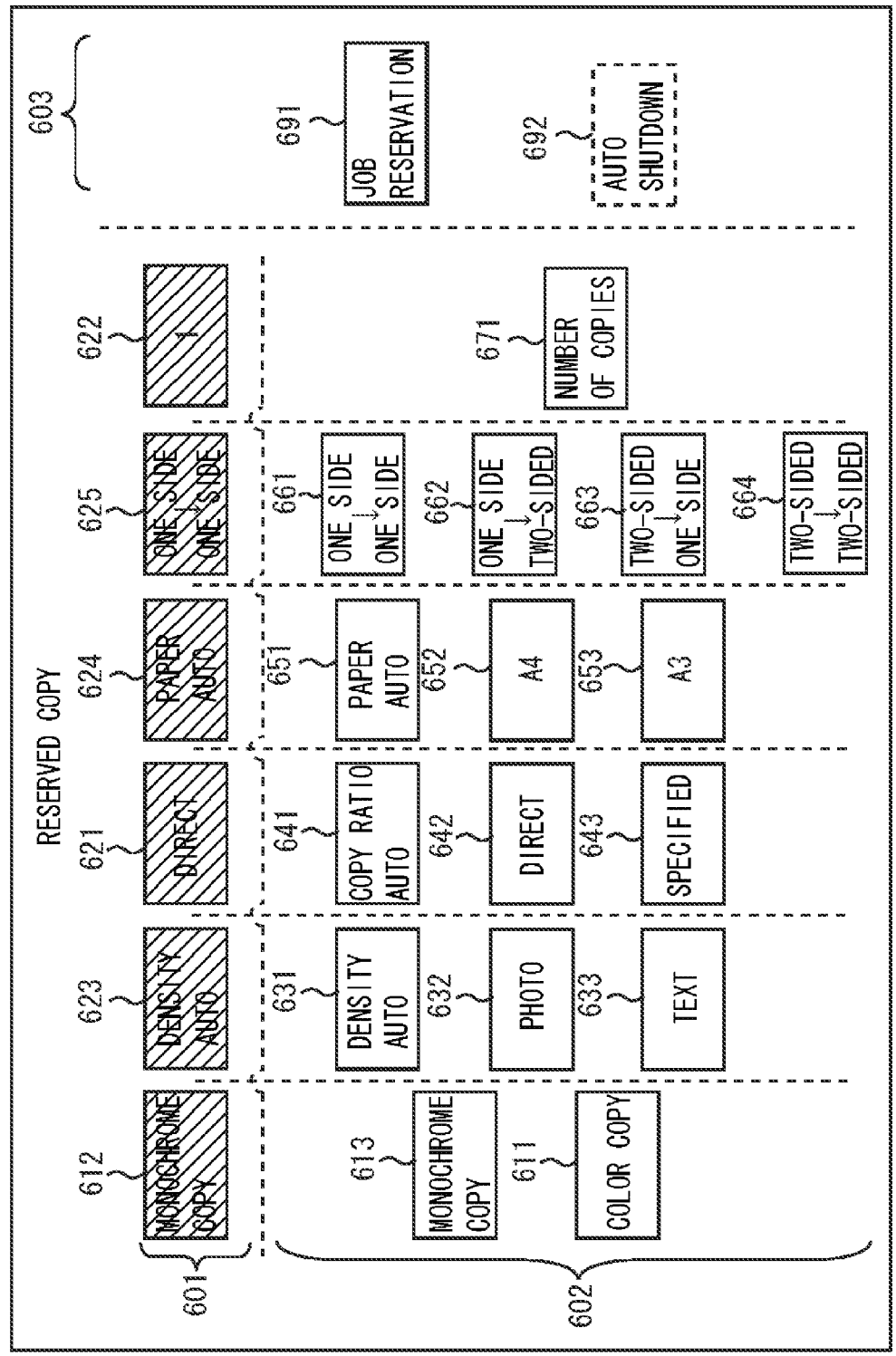
FIG. 7 is a schematic diagram illustrating an example of first and second simple operation screens displayed in an operation unit shown in FIG. 1.

In the example of FIG. 2, after power is turned ON at timing T101, the CPU 201 executes the boot program 111 stored in the nonvolatile memory (e.g., ROM 202 shown in FIG. 1) to start the MFP 200. The CPU 201 executes the boot program 111 to display a first simple operation screen 121 which is a text-based simple operation screen (e.g., job setting screen) on the PANEL 206. FIG. 7 illustrates a display example of the first simple operation screen. In this state, the user can operate the MFP 200 by operating a button disposed in the first simple operation screen 121 or the PANEL 206. For example, the user can set a reserved job that is automatically executed by the CPU 201 after start of the MFP 200 is completed.

According to this example, while the first simple operation screen 121 is displayed (timings T101 to T104), the CPU 201 executes the boot program 111 to prepare storage in step S102. For example, the CPU 201 carries out spinning-up of the HDD 210 which stores the control program 112. Upon completion of the spinning-up of the HDD 210, the CPU 201 loads the control program from the HDD 210 to the RAM 203 in S103.

When the processing of loading the control program 112 is finished at the timing T104, the CPU 201 executes the control program 112 loaded to the RAM 203. In step S105, the CPU 201 obtains configuration information indicating what configuration the MFP 200 has and initializes each module for starting the MFP 200 by executing the control program 112. More specifically, the CPU 201 may check a configuration of its own apparatus via a bus 215. For example, the CPU 201 may transmit a signal to the printer 212, determine that its own apparatus includes the printer 212 when a response comes from the printer 212 via the bus 215, and store its information in the HDD 210. The CPU 201 may similarly check whether the apparatus includes a scanner 213 or a post-processing apparatus such as a stapler, or a book binding unit.

According to this embodiment the CPU 201 causes, by executing the control program 112, the operation unit to display a second simple operation screen 122 (e.g., a job setting screen) of a text base that may be similar to that of the first simple operation screen 121. FIG. 7 illustrates a display example of the second simple operation screen 122. The first and second simple operation screens 121 and 122 may be similar in terms of displayed contents, but may be different in that the contents may be displayed by execution of the boot program 111 or execution of the control program 112 by the CPU 201. Contents set in the first simple operation screen 121 may be taken over by the second simple operation screen 122. For example, the CPU 201 may store a setting received from the user via the first simple operation screen 121 in the RAM 203, and may display the second simple operation screen 122 based on the setting stored in the RAM 203 at the timing T104.

Since the setting may be taken over via the first simple operation screen 121, the user can continuously set reserved jobs by operating buttons disposed in the second simple operation screen 122 or the operation unit. The CPU 201 also stores the setting received via the second simple operation screen 122 in the RAM 203.

While the second simple operation screen 122 is displayed, in step S105, the CPU 201 may execute the control program 112 to initialize each module for starting the main body of the MFP 200. Modules to be initialized may include, for example, at least one of the PRINTER 212 and the SCANNER 213 provided in the MFP 200. When the initialization of each module of the MFP 200 is finished at the timing T106, the CPU 201 may display a normal operation screen 123 in the operation unit. The CPU 201 can cause the operation unit to display the normal operation screen 123 by executing the control program 112. The second simple operation screen 122 and the normal operation screen 123 may be different in terms of the displayed contents. The screen to be displayed depends on whether the CPU 201 executes the boot program or the control program to display the contents. The contents set in the second simple operation screen may be taken over by the normal operation screen 123. For example, the CPU 201 may store the setting received from the user via the second simple operation screen 122 in the RAM 203, and may display the normal operation screen 123 based on the setting stored in the RAM 203 at the timing T106.

As described above, in the exemplary embodiment, before the HDD 210 which stores the control program 112 is initialized, the CPU 201 causes the operation unit to display the first simple operation screen 121. Thus, the user can set jobs via the operation unit without waiting for completion of the initialization processing of the HDD 210. The CPU 201 can cause the second simple operation screen 122 to take over the setting received via the first simple operation screen 121, and can cause the normal operation screen 123 take over the setting received via the second simple operation screen 122. As a result, the user can reflect contents set in the first and second simple operation screens 121 and 122 on the normal operation screen 123, and operate the MFP 200 via the normal operation screen 123. The CPU 201 can also receive further setting of jobs from the user via the normal operation screen 123, which has taken over the setting received via the first or second simple operation screen 121 or 122. Thus, the user can perform other settings (e.g., additional settings or releasing of a setting carried out in the first or second simple operation screen 121 or 122) via the normal operation screen 123 in addition to the contents set in the first and second simple operation screen 121 and 122. The CPU 201 can process the jobs based on the setting of the job received via the first or second simple operation screen 121 or 122, and further based on the setting of the job received via the normal operation screen 123.

The CPU 201 may display a screen for selecting switching of a screen to the normal operation screen 123 at timing when a screen can be switched from the second simple operation screen 122 to the normal operation screen 123. When instructed by the user to switch the screen to the normal operation screen, the CPU 201 can perform control to display the normal operation screen 123 which has taken over the job setting. On the other hand, when instructed not to switch the screen to the normal operation screen 123, the CPU 201 maintains display of the second simple operation screen 122, and may receive a setting from the user via the display of the second simple operation screen. In this case, when a job execution instruction is received from the user by a job reservation button 691 shown in FIG. 7, the CPU 201 processes the job based on the setting received from the user via the second simple operation screen 122. Thus, for example, when job setting can be carried out only on the simple operation screen shown in FIG. 7, the user can continue the operation while maintaining display of the simple operation screen even if the normal operation screen 123 could also be displayed. The case where the CPU 201 receives the job execution instruction from the user by the job reservation button 691 has been described. However, the CPU 201 may also receive an execution instruction from the user by a start key of the PANEL 206.

Difference time 124, as shown in the example of FIG. 2, indicates time elapsed from the timing T101 when the MFP 200 is turned ON to the timing T106. As compared with an operation via the normal operation screen 123, an operation via the first simple operation screen 121 shortens the waiting time until the MFP 200 may be operated by the user, the waiting time being shortened by the difference time 124.

According to this embodiment, on the first simple operation screen 121, in place of a high-level user interface such as graphics, items that can be set on a text basis may be displayed. Similarly, on the second simple operation screen 122, in place of a high-level user interface such as graphics, items that can be set on a text basis may be displayed. When the first simple operation screen 121 is configured on the text basis, the processing for displaying the first simple operation screen can be reduced, and the time until the first simple operation screen 121 is displayed can be shortened.

Figure 3:
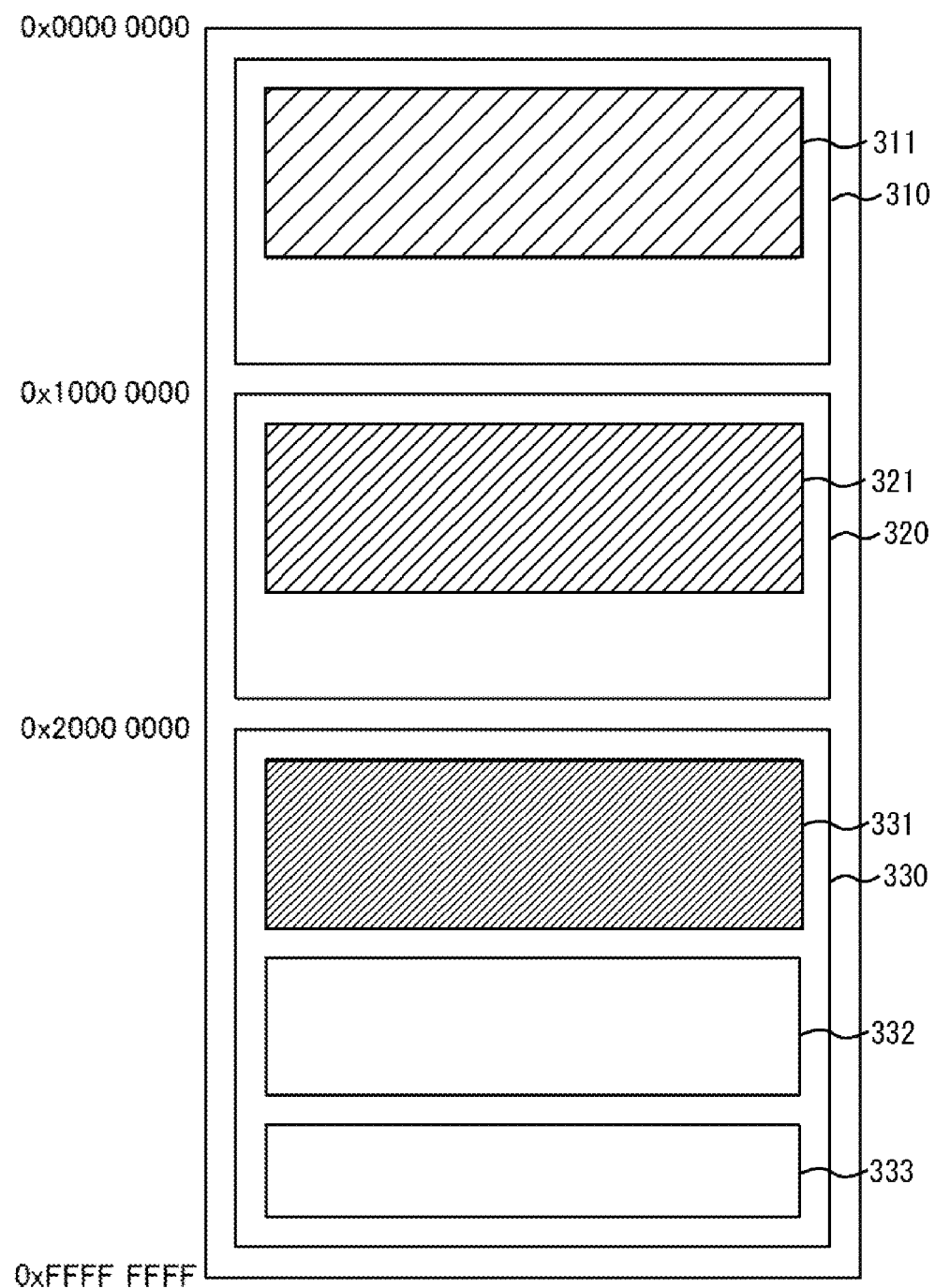
FIG. 3 illustrates an example of a memory map managed by a CPU shown in FIG. 1.

FIG. 3 is a schematic diagram illustrating an example of a memory map managed by the CPU 201 shown in FIG. 1.

This memory map may be fixedly allocated by hardware based on a setting of the CPU 201.

In the example of FIG. 3, a boot ROM area 310 indicates an area in the ROM 202. Data stored in this area is kept even when power of the MFP 200 is cut off. A NVRAM area 320 indicates an area in the NVRAM 211.

A RAM area 330 indicates an area in the RAM 203. A boot program 311 is stored in the boot ROM area 310. The boot program 311 of FIG. 3 corresponds to the boot program 111 of FIG. 2.

An initial value 321 of configuration information of the MFP 200 or a job setting displayed on the first simple operation screen 121 is stored in the NVRAM area 320.

A control program 331 is loaded to the RAM area 330. The control program 331 of FIG. 3 corresponds to the control program 112 of FIG. 2.

A work area 332 is an area which the CPU 201 uses as a work area by executing the control program 331. A value regarding a reserved job set in the first or second simple operation screen 121 or 122 as shown in FIG. 7 is stored in the work area 332. The reserved job is reserved by the job reservation button 691 for receiving reservation. An image memory area 333 is allocated to image processing of the CPU 201.

In the exemplary embodiment, the boot ROM and the NVRAM are directly mapped on addresses to execute the processing. However, the processing may also be carried out after a content of the boot ROM is copied to the RAM area 330. In this case, the processing becomes somewhat complex. However, a speed can be increased because the boot program can be read from the RAM 330 which is a high-speed memory in start processing.

Figure 4:
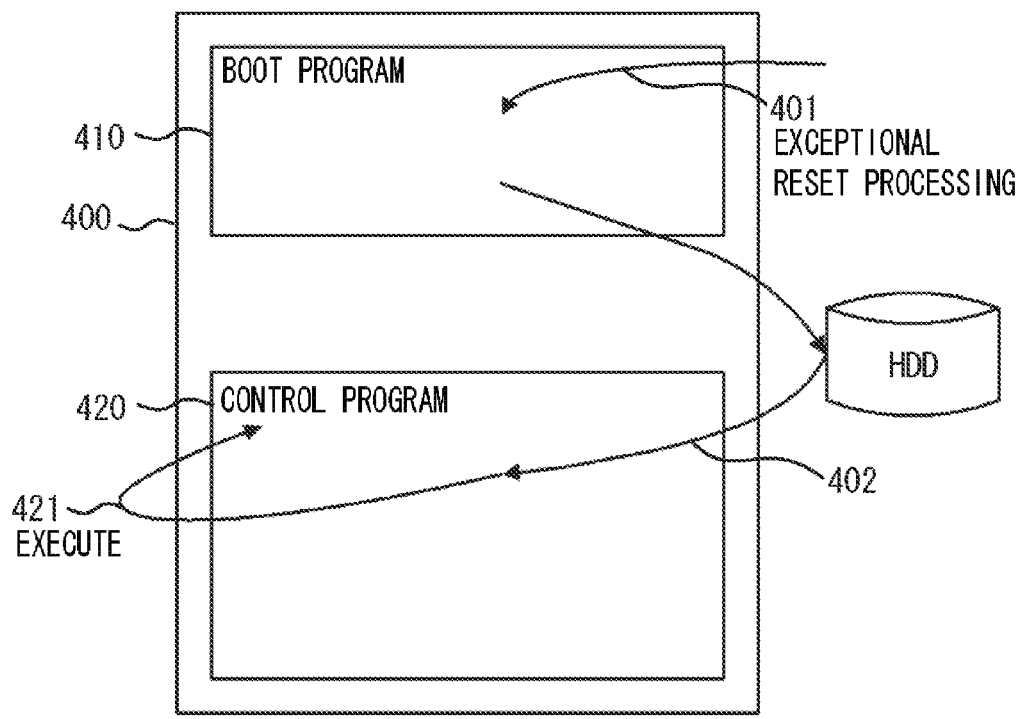
FIG. 4 is a conceptual diagram illustrating an example of a program boot sequence in the MFP of the exemplary embodiment.
Figure 5:
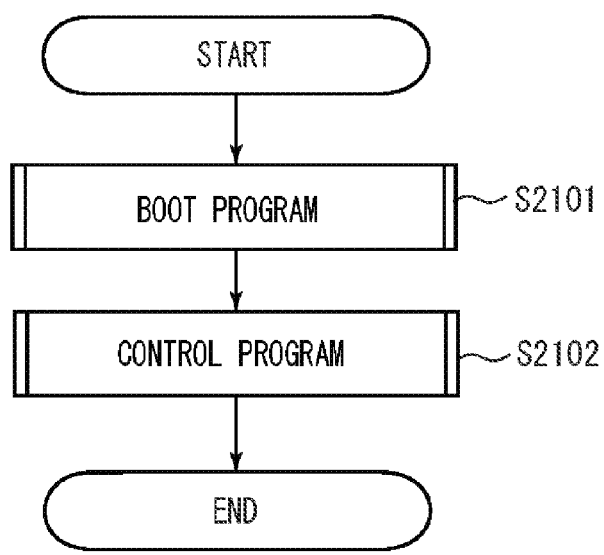
FIG. 5 is a flowchart illustrating an example of data processing in the MFP of the exemplary embodiment.

Next, referring to the examples shown in FIGS. 4 and 5, a boot procedure of a program will be described. FIG. 4 is a conceptual diagram illustrating an example of a boot procedure of a program in the MFP 200 of the exemplary embodiment. FIG. 5 is a flowchart illustrating an example of a boot procedure of a program in the MFP 200 of the exemplary embodiment.

In the example shown in FIG. 4, a memory space 400 can be accessed by the CPU 201. A boot program 410 corresponds to the boot program 311 shown in the example of FIG. 3. A control program 420 corresponds to the control program 331 shown in the example of FIG. 3.

Steps S2101 and S2102 can be realized when the CPU 201 loads the program from the ROM 202 or the HDD 210 into the RAM 203 to execute it.

Processing of FIG. 5 may be started when the user turns ON a power button disposed in the main body of the MFP 200.

First, in step S2101, the CPU 201 executes the boot program 111. This timing corresponds to the timing T101 of the timing chart example shown in FIG. 2, and the MFP 200 is turned ON at this timing T101.

After the MFP 200 has been turned ON, a reset sequence is issued to a board of the MFP 200. After the reset sequence has been issued to the board of the MFP 200, the CPU 201 executes exceptional reset processing shown in the example of FIG. 4 to start the boot program 410. Processing carried out by executing the boot program 410 will be described below.

Then, the CPU 201 executes the boot program to load the control program 112 stored in the HDD 210 to the memory 420 (path 402). After the control program 112 has been loaded to the memory 420, in S2102, the CPU 201 advances the processing to an execution address of the control program 112 to execute the control program (path 421). In this case, since the RAM 203 is a volatile memory, the RAM area 330 is filled with indefinite data. Thus, the CPU 201 may have to re-expand the control program 112 in the memory each time the MFP 200 is started to execute the program. An example of processing carried out by executing the control program 112 will be described below.

Next, an example of data in the NVRAM 211 and the first simple operation screen 121 processed by executing the boot program 410 will be described.

Figure 6:
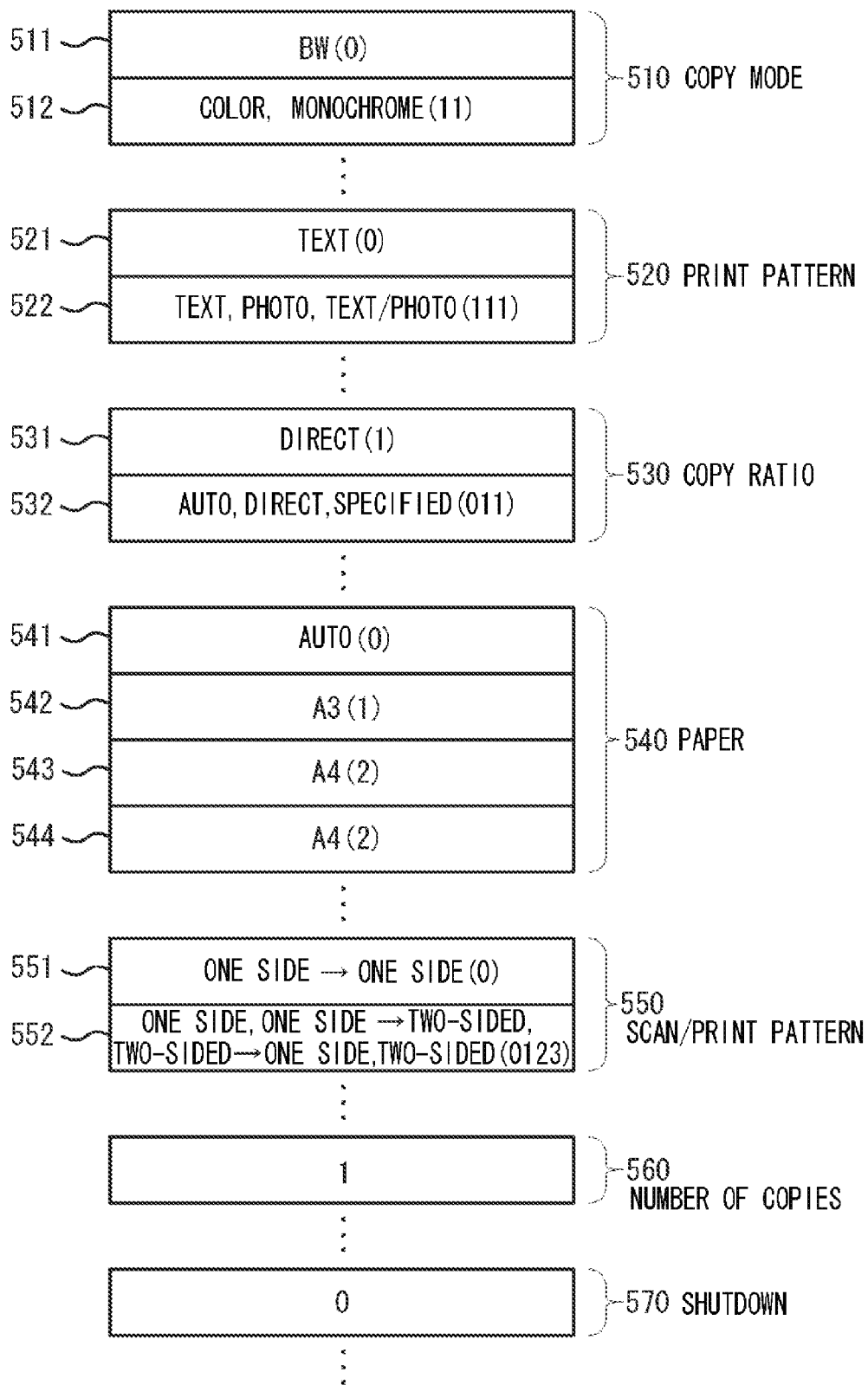
FIG. 6 is a schematic diagram illustrating an example of a structure of configuration information and initial value data in a NVRAM shown in FIG. 1.

FIG. 6 is a schematic diagram illustrating an example of configuration information of the MFP 200 and an initial value of the setting stored in the NVRAM 211 shown in FIG. 1. The configuration information indicates at least one of a state of the MFP 200, various configurations, and presence of a function, and the initial value indicates a setting value of default displayed on the operation screen.

As illustrated in the example shown in FIG. 6, pieces of information indicating the state of the MFP 200 and the function may include, for example, one or more of a copy mode 510, a print pattern 520, a copy ratio 530, paper 540, a scan/print pattern 550, and the number of copies 560.

The copy mode 510 may be a monochrome copy or a color copy. The print pattern 520 may be a text mode or a photo mode.

The copy ratio 530 may change a size of output data from original data. The paper 540 may be a paper size to be output. The scan/print pattern 550 may indicate whether scan data is one-sided/two-sided, and whether print data is one-sided/two-sided.

The number of copies 560 may be a number of output copies. In addition, the NVRAM 211 can store information regarding an order of outputting the data, and information indicating various functions such as binding by staples.

According to this embodiment, an initial value of the copy mode 510 is stored in an area 511 of the copy mode 510, and the configuration information (e.g., information regarding presence of a function) is stored in an area 512 of the copy mode 510.

In the exemplary embodiment, as initial values of the copy mode 510, "0" of the area 511 indicates a monochrome copy, and "1" indicates a color copy. Presence of each copy mode function is indicated by a bit value (i.e., flag) of the area 512: a 1st bit from the left indicates presence of a monochrome copy function, a 2nd bit from the left indicates presence of a color copy function.

In a case where information shown in the areas 511 and 512 of the example of FIG. 6 is stored, an initial value of the copy mode 510 is a monochrome copy, indicating that the MFP 200 has a monochrome copy function and a color copy function. If the MFP 200 has a monochrome copy function but not a color function, a value of the area 512 is "10".

Similarly, an initial value of the print pattern 520 is a value of the area 521: "0" indicating a text (C), "1" indicating a photo, and "2" indicating a text/photo. Presence of a function is indicated by a value of the area 522: a 1st bit from the left indicates a text, a 2nd bit indicates a photo, and a 3rd bit indicates a text/photo.

An initial value of the copy ratio 530 is a value of the area 531: "0" indicating auto, "1" indicating direct, and "other than 0 and 1" indicating specifying of a copy ratio. Function presence is a value of the area 532: 1st to 3rd bits from the left indicate "auto", "direct", "specify" in this order.

An initial value of the paper 540 is a value set in the area 541: "0" indicating auto, and "other than 0" indicating a specified paper size.

Configuration information of a cassette (i.e., paper feeding unit) may be set to values of the areas 542 to 544. Correspondence between a paper size and the values may be predefined. In the exemplary embodiment, A2 is "1", A4 is "2", and a letter is "5". For example, a value set in the area 542 corresponds to a paper size of a 1st cassette, and A3 is set. A value set in the area 543 corresponds to a paper size of a 2nd cassette, and A4 is set. A value set in the area 544 corresponds to a paper size of a 3rd cassette, and A4 is set.

In the present exemplary embodiment, the MFP 200 having three cassettes has been described as an example. However, even when the number of cassettes increases, by increasing memory areas accordingly, an initial value and a paper size set in each cassette can be set up.

An initial value of the scan/print pattern 550 may be stored in the area 551. When a value set in the area 551 is "0", one side of a document is read, and one-sided printing is carried out.

When a value set in the area 551 is "1", one side is read, and two-sided printing is carried out.

When a value set in the area 551 is "2", two sides are read, and one-sided printing is carried out. When a value set in the area 551 is "3", two sides are read, and two-sided printing is carried out.

Presence of a function may be indicated by a value set in the area 552: 1st to 4th values from the left indicate "one-sided reading→one-sided printing", "one-sided reading→two-sided printing", "two-sided reading→one-sided printing", and "two-sided reading→two-sided printing" in this order.

An initial value of the number of copies may be set in the number of copies 560.

In addition to the above areas, an area 570 may be set as an area indicating presence of a shutdown reservation. The area 570 will be described below in detail.

FIG. 7 illustrates an example of the first and second simple operation screens displayed in the PANEL 206 shown in FIG. 1. This example is an operation screen for setting a reserved job, and is configured on a text basis.

In the example of FIG. 7, a place 601 indicates a currently set function (mode), and a place 602 indicates a mode which the user can select. On the screen of FIG. 7, the place 601 indicates that a monochrome copy key 612 is currently set. As keys selectable by the user, the place 602 indicates a monochrome copy key 613 and a color copy key 611.

For a density, the place 601 indicates that a density auto 623 is currently set. As keys selectable by the user, the place 602 indicates a density auto key 631, a photo key 632, and a text key 633.

For a copy ratio, the place 601 indicates that a direct 621 is currently set. As a key selectable by the user, the place 602 indicates a copy ratio auto key 641, a direct key 642, and a specify key 643.

For paper selection, the place 601 indicates that a paper auto 624 is currently set. As keys selectable by the user, a paper auto key 651, an A4 key 652, and an A3 key 653 are selectable. The paper auto function is a function for selecting paper of a size equal to a document size if there is paper of a size equal to the document size.

As to one side/two sides, the place 601 indicates that a mode 625 for "one-sided copying one-sided document" is currently set. As keys selectable by the user, a mode 661 for "one-sided copying one-sided document", a mode 662 for "one-sided copying two-sided document", a mode 663 for "two-sided copying one sided document", and a mode 664 for "two-sided copying two-sided document" are prepared.

For the number of copies, the place 601 indicates that one copy is currently set. As a key selectable by the user, a number-of-copies key 671 is indicated. The CPU 201 counts up a value of the number of copies (a key 622) by "1" each time the user presses the number-of-copies key 671. In addition to the number-of-copies key 671 for counting up the number of copies, a number-of-copies key may be disposed to count down a value each time the user presses this key. The number of copies may be set by the number-of-copies key 671, or a value received from ten keys of the PANEL 206 may be set.

When a job reservation button 691 is pressed, the CPU 201 reserves job execution based on a currently set value (e.g., value indicated by the place 601). The CPU 201 can execute a reserved job according to a setting indicated by the place 601 at the timing (T106) when initialization of each module of the MFP 200 and acquisition of the configuration information are completed.

An auto shutdown button (e.g., shutdown reception button) 692 is selectable after the job reservation button 691 is selected by a user's operation and job reservation is completed. When the user presses the auto shutdown button 692, after executing the job, the CPU 201 turns OFF the MFP 200. Thus, the user can perform a setting such that after starting the MFP 200, a job is set and reserved, and then the MFP 200 is automatically turned OFF, via the simple operation screen without waiting for job execution completion of the MFP 200.

In the present exemplary embodiment, the auto shutdown button 692 becomes selectable after the job reservation is completed. However, exemplary embodiments of the invention are not limited thereto. For example, the auto shutdown button 692 may also be selectable even without any job reservation. In a case where the auto shutdown button 692 is pressed while no job has been reserved, when the normal operation screen 123 can be displayed, the CPU 201 performs control to automatically turn OFF the MFP 200.

Figure 8:
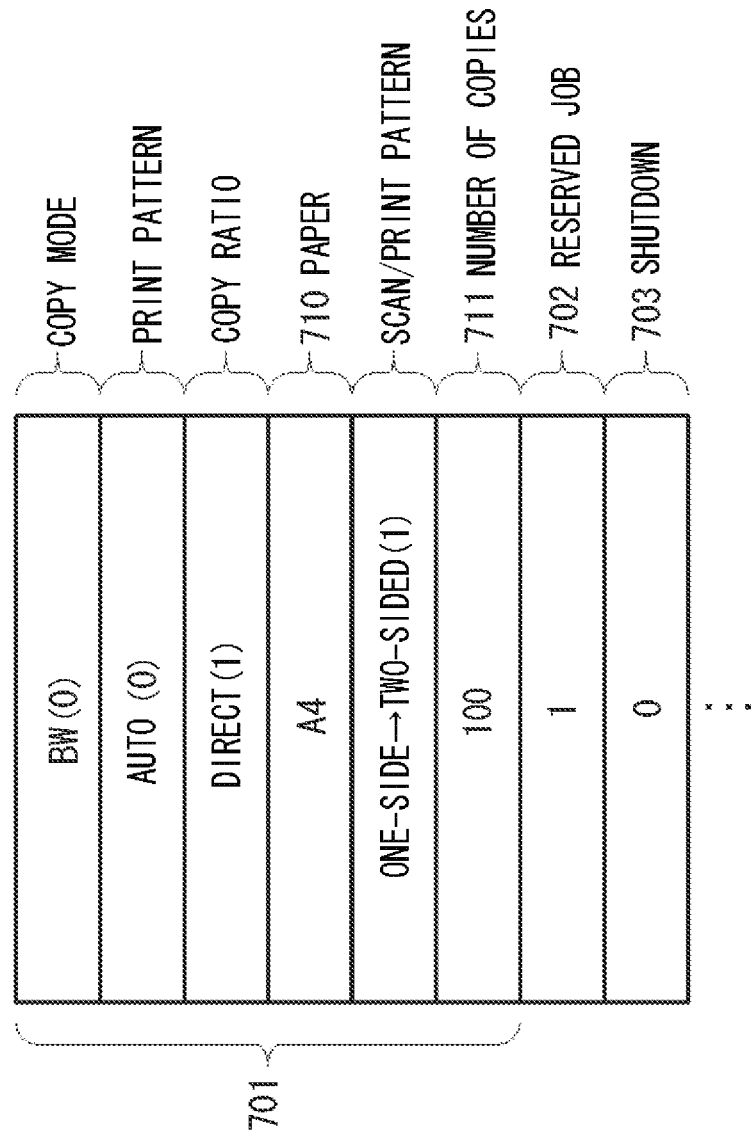
FIG. 8 is a schematic diagram illustrating a storage example of data entered from the first and second simple operation screens shown in FIG. 2.

FIG. 8 illustrates a storage example of data received via the first and second simple operation screens 121 and 122 in the work area 332 of the RAM 203.

In the example shown in FIG. 8, mode selection information 701 can contain one or more of a copy mode, a print pattern, a copy ratio, paper 710, a scan/print pattern, and the number of copies 711. These are pieces of information that may be set by the operation key 602 shown in FIG. 7. The CPU 201 displays this information in the section 601 of the operation screen of FIG. 7.

In this example, a reserved job flag 702 has an initial value set to "0". When the user presses the job reservation button 691 shown in the example of FIG. 7, the CPU 201 sets "1". When the user presses the job reservation button 691 again, the CPU 201 sets the reserved job flag 702 of "1" to "0".

A shutdown flag 703 has an initial value set to "0". When the user presses an auto shutdown 692 shown in FIG. 6, the CPU 201 sets "1".

If the reserved job flag 702 is "1" when initialization of each module of the MFP 200 and acquisition of configuration information are completed, the CPU 201 automatically executes a reserved job according to setting stored in mode selection information 701. On the other hand, if the reserved job flag 702 is "0", the CPU 201 causes the operation unit to display the normal operation screen 123 reflecting the mode selection information 701.

The CPU 201 may determine whether the shutdown flag 703 has been set to "1" after completion of the execution of the reserved job. If set to "1", the CPU 201 can perform control to turn OFF the MFP 200. If not set to "1", the CPU 201 can receive, without turning OFF the MFP 200, further job setting or other operations from the user via the normal operation screen 123.

Figure 9:
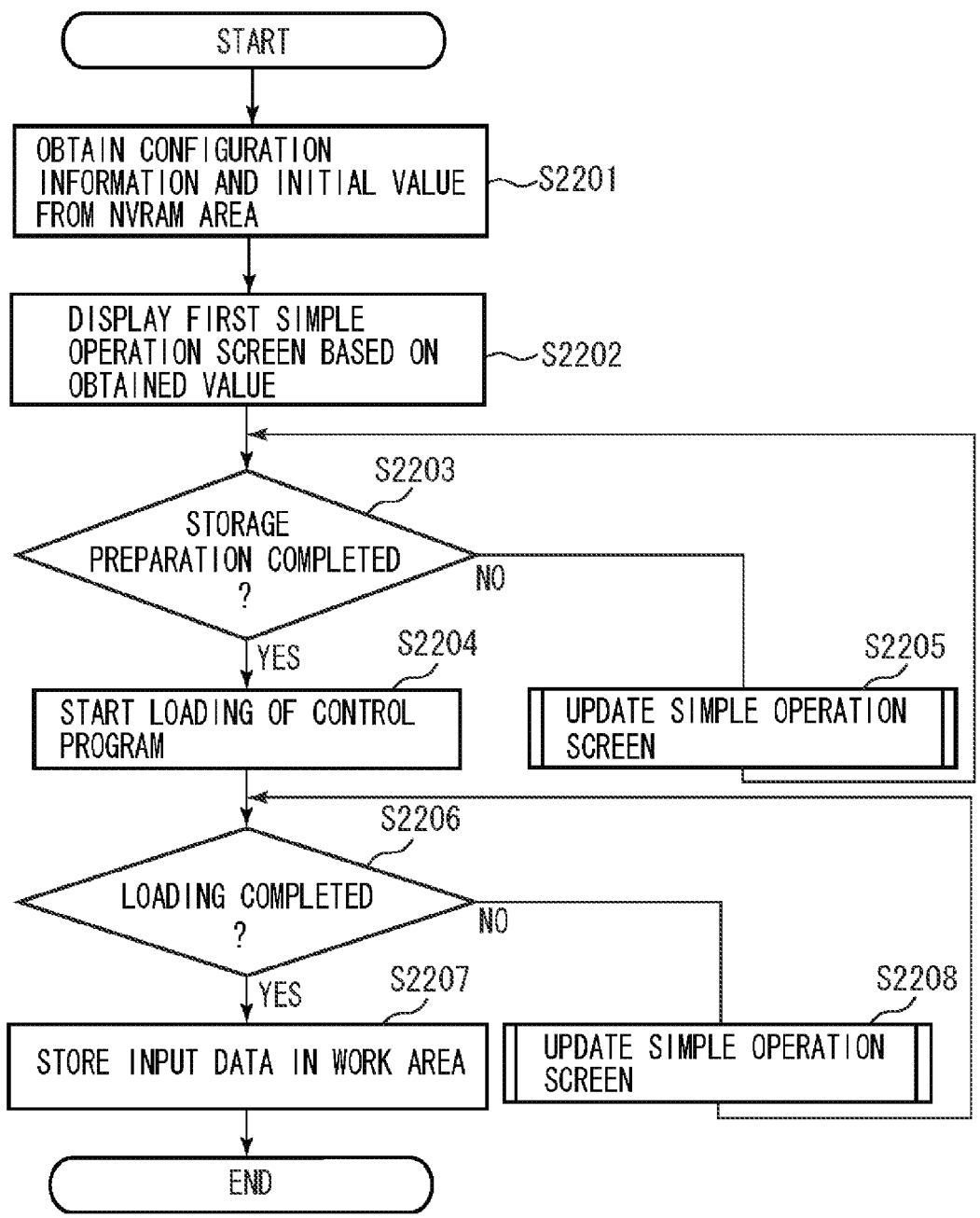
FIG. 9 is a flowchart illustrating an example of data processing in the MFP of the exemplary embodiment.

FIG. 9 is a flowchart illustrating an example of data processing in the MFP 200 according to the exemplary embodiment. Steps S2201 to S2208 shown in FIG. 9 may be realized when the CPU 201 loads the program from the ROM 202 or the HDD 210 to the RAM 203 to execute it.

According to this example, the CPU 201 first reads the boot program from the ROM 202 to execute it. Then, the CPU 201 executes step S2201. The CPU 201 obtains configuration information 500 and an initial value (e.g., FIG. 6) of the MFP 200 stored in the NVRAM 211. The configuration information 500 and the initial value are those stored in the NVRAM 211 at the last start time of the MFP 200.

In step S2202, the CPU 201 causes the operation unit to display a first simple operation screen 121 as shown for example in FIG. 7 based on the configuration information and the initial value obtained in step S2201.

In step S2202, the CPU 201 displays an initial value of each item obtained in step S2201 in an upper part 601 of the first simple operation screen 121. Similarly, the CPU 201 displays a button for setting a selectable mode of each item obtained in step S2201 in a lower part 602 of the first simple operation screen 121.

The CPU 201 may display the job reservation button 691 for reserving jobs and the auto shutdown button 692 for using an auto shutdown function in a right part 603 of the first simple operation screen. As described above, the auto shutdown button 692 may be kept unselectable until the job reservation button 691 is selected, and may be displayed to be selectable when the job reservation button 691 is selected to complete job reservation.

In step S2203, the CPU 201 determines whether preparation of the HDD 210 (i.e., storage device) shown in FIG. 2 has been completed.

The preparation processing is processing such as spinning-up of the HDD 210 to load the control program 112 from the HDD 210.

If it is determined in step S2203 that the preparation of the HDD 210 is not yet completed (NO in step S2203), processing proceeds to step S2205, where the CPU 201 updates the first simple operation screen 121 displayed by the operation unit via the PANEL C 205, and processing returns to step S2203. An example of update processing of the first simple operation screen in step S2205 will be described below.

On the other hand, if it is determined in step S2203 that the preparation of the HDD 210 has been completed (YES in step S2203), then the CPU 201 proceeds to step S2204. In step S2204, the CPU 201 executes processing for loading the control program 112 to the RAM 203 in the path 402 shown in the example of FIG. 4 (corresponding to step S103 shown in the example of FIG. 2).

In step S2206, the CPU 201 determines whether the loading of the control program 112 to the RAM 203 has been completed. If it is determined that the loading of the control program 112 is not yet completed (NO in step S2206), processing proceeds to step S2208, where the CPU 201 updates the first simple operation screen 121, after which processing returns to step S2206.

On the other hand, if it is determined in step S2206 that the loading of the control program 112 has been completed (YES in step S2206), the CPU 201 proceeds to step S2207. In step S2207, the CPU 201 stores data entered via the first simple operation screen 121 displayed by the operation unit or a hard button (e.g., including ten keys) of the operation unit, in the work area 332 of the RAM 203 and then finishes the processing.

For example, the CPU 201 may store mode selection information of an operation mode corresponding to each item displayed in the upper part 602 of a simple operation screen in the operation unit, in the work area 332 of the RAM 203 with a data structure as shown in the example of FIG. 8. ON/OFF of the job reservation and the auto shutdown mode in the first simple operation screen 121 may be respectively stored, with "1" in the case of ON and "0" in the case of OFF, as flags 702 and 703 in the work area 302.

Figure 10:
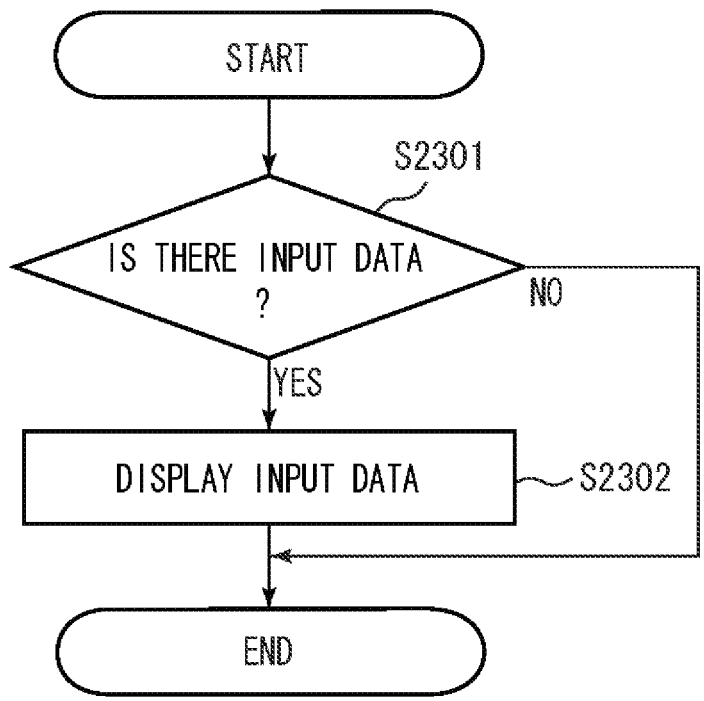
FIG. 10 is a flowchart illustrating an example of data processing in the MFP of the exemplary embodiment.

FIG. 10 is a flowchart illustrating an example of data processing in the MFP 200 according to the exemplary embodiment. The data processing of FIG. 10 is an example of update processing of the simple operation screen in steps S2205 and S2208 shown in FIG. 9. Steps S2301 and S2302 may be realized when the CPU 201 loads the program from the ROM 202 or the HDD 210 to the RAM 203 to execute it.

In the example of simple operation screen update processing, first, in step S2301, the CPU 201 determines whether the user has pressed the key (e.g., soft key) displayed in the operation unit or the operation button (e.g., hard key) disposed in the operation unit.

If it is determined that there is no input data (NO in step S2301), the CPU 201 finishes the processing.

On the other hand, if it is determined in step S2301 that there is input data (YES in step S2301), processing proceeds to step S2302 where the CPU 201 detects which key or button has been pressed, and performs a display where input information of the pressed key or button is reflected on the simple screen (e.g., FIG. 7), and then finishes the processing.

Thus, when the user operates the operation unit and presses a button of an item displayed in the lower part 602 of the simple operation screen shown in the example of FIG. 7, a setting corresponding to the pressed key is reflected on displaying of the upper part 601.

For example, when the user presses the color copy key 611, the CPU 201 may update a display state of the copy mode 612 from a monochrome copy to a color copy.

Similarly, when the user presses the button disposed in the operation unit of the MFP 200 to specify a copy ratio or the number of copies, the CPU 201 may perform control to change a selectable value of each mode displayed in the upper part 601 to display it.

When the user presses the job reservation button 691 or the auto shutdown button 692, the CPU 201 can perform control to reverse a display color of the job reservation button 691 or the auto shutdown button 692. Thus, the user can recognize whether each mode is currently in a set state.

Figure 11:
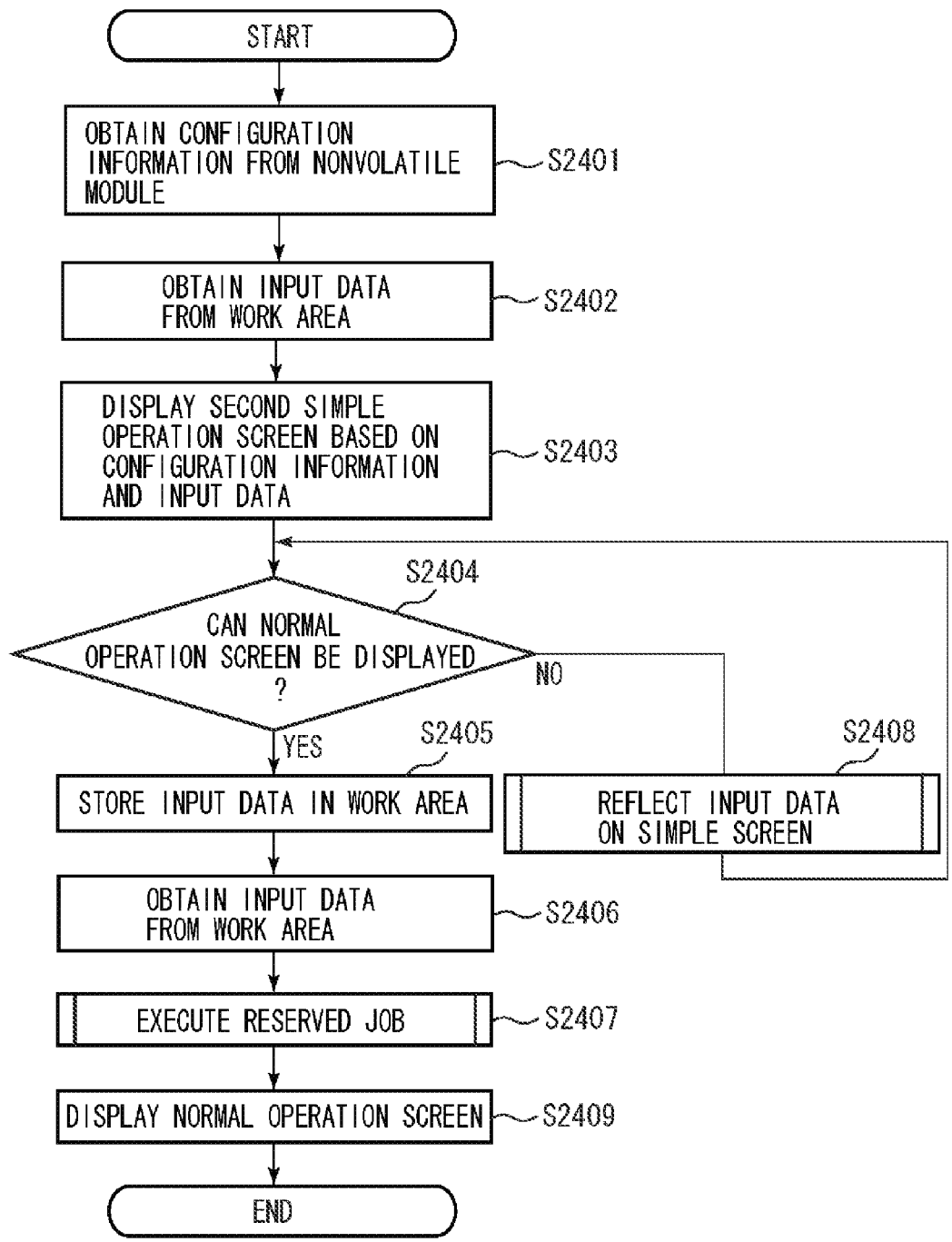
FIG. 11 is a flowchart illustrating an example of data processing in the MFP of the exemplary embodiment.

FIG. 11 is a flowchart illustrating an example of data processing in the MFP 200 according to the exemplary embodiment. The processing shown in the flowchart of FIG. 11 is an example of processing executed by the CPU 201 in step S2102 of FIG. 5. Steps S2401 to S2409 may be realized when the CPU 201 loads the boot program from the ROM 202 or the HDD 210 to the RAM 203 to execute it.

When the control program 112 is executed, first, in step S2401, the CPU 201 obtains configuration information 500 of the MFP 200 from the NVRAM 211.

In step S2402, the CPU 201 obtains mode selection information 701 of each item stored in step S2207 shown in the example of FIG. 9, and ON/OFF information of the flags 702 and 703 of the job reservation and the auto shutdown mode.

In step S2403, based on the information obtained in steps S2401 and S2402, the CPU 201 controls the PANEL C 205 to cause the operation unit to display the second simple operation screen 122 (e.g., FIG. 7).

Then, based on the information obtained in step S2401, as in the case of step S2202 shown in FIG. 9, the CPU 201 can display selectable items in the lower part 602 of the simple operation screen on a text basis. Based on the information obtained in step S2402, the CPU 201 can display a set state of the job reservation or the auto shutdown in the upper part 601 or the right part 603 of the second simple operation screen displayed on the PANEL 206. In other words, the CPU 201 can cause the second simple operation screen to take over the setting in the first simple operation screen, and can cause the operation unit to display the setting.

Figure 12:
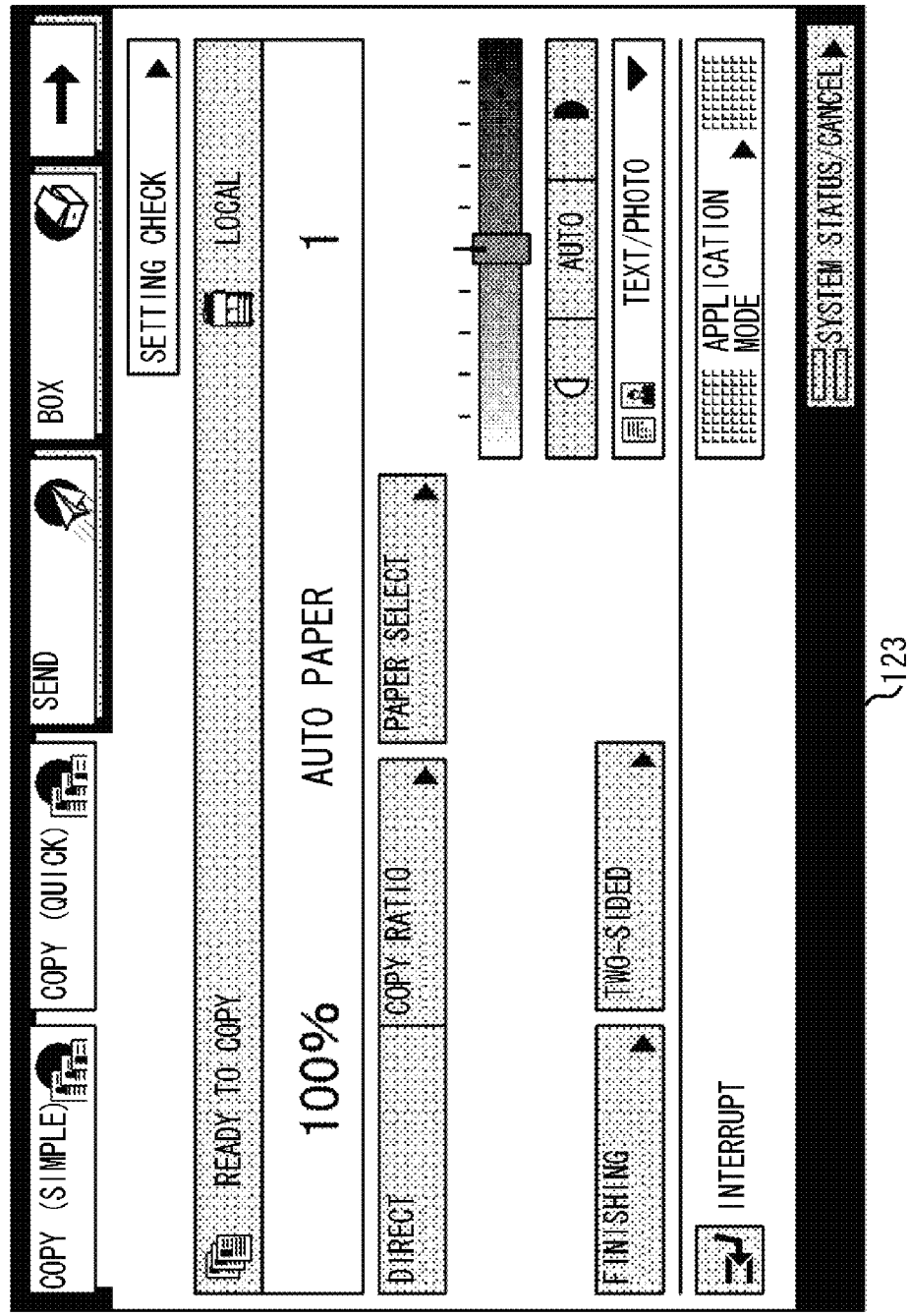
FIG. 12 is a schematic diagram illustrating an example of a normal operation screen displayed in the operation unit shown in FIG. 1.

In step S2404, the CPU 201 determines whether the normal operation screen 123 which is shown in FIG. 12 as an example can be displayed. FIG. 12 is a schematic diagram illustrating an example of the normal operation screen displayed in the operation unit. Unlike the display configuration of the simple operation screen shown in FIG. 7, the normal operation screen 123 shown in FIG. 12 is not required to be displayed only on a text basis, but can also include a complex user interface such as an icon or a tab sheet by graphics.

The normal operation screen 123 shown in FIG. 12 can be displayed after initialization of each module for operating the MFP 200 and acquisition of configuration information of the MFP 200 are completed.

If it is determined that the normal operation screen 123 can be displayed (YES in step S2404), the CPU 201 proceeds to step S2405. In step S2405, the CPU 201 overwrites the data in the work area 332 of the RAM 203 with data entered from the user via the operation button disposed in the second simple operation screen 122 (e.g., FIG. 7) or the operation unit and stores the overwritten data.

In step S2406, the CPU 201 obtains setting of a job stored in the work area 332. In step S2407, when there is setting made by the job reservation button 691 to execute the job, the CPU 201 executes the reserved job according to the job setting obtained in step S2406. In step S2409, based on information stored in the work area 332 of the RAM 203, the CPU 201 displays the normal operation screen 123 in the operation unit, and then finishes the processing. Steps S2407 and S2409 may also be reversed, or may be executed in parallel. An example of the reserved job execution will be described in detail below.

On the other hand, if it is determined that the normal operation screen 123 cannot be displayed (NO in step S2404), processing proceeds to step S2408, where the CPU 201 updates the second simple operation screen to reflect input data, and processing then returns to step S2404. The update processing of the second simple operation screen is as described above referring to the example of FIG. 10.

Figure 13:
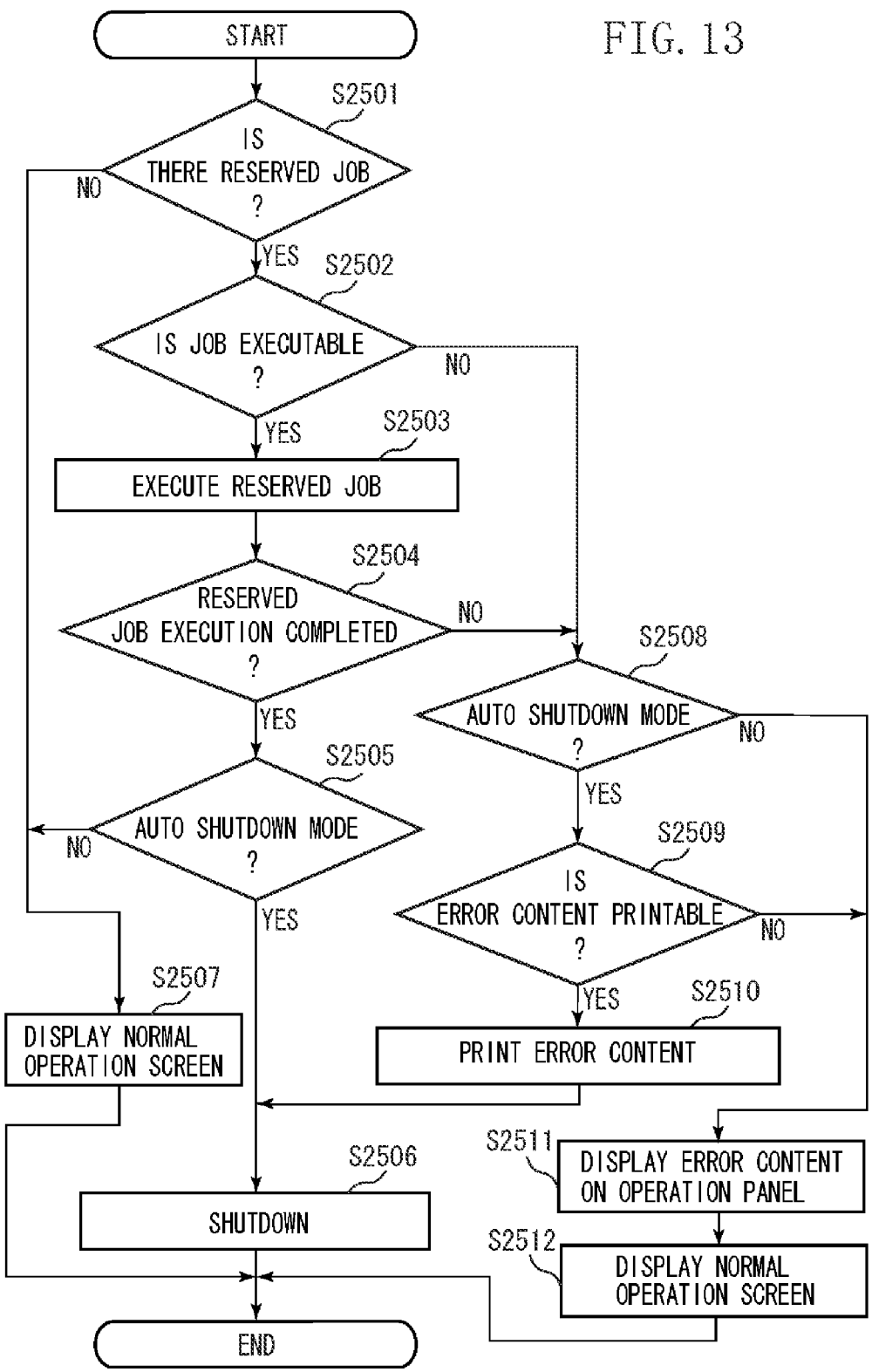
FIG. 13 is a flowchart illustrating an example of data processing in the MFP of the exemplary embodiment.

FIG. 13 is a flowchart illustrating an example of reserved job execution in the MFP 200 according to the exemplary embodiment. Processing of FIG. 13 corresponds to step S2406 of the example shown in FIG. 11. Steps S2501 to S2512 may be realized when the CPU 201 loads the program from the ROM 202 or the HDD 210 to the ROM 203 to execute it.

First, in step S2501, the CPU 201 determines whether a job has been reserved in the first and second simple operation screen 121 and 122. When the flag 702 of the reserved job stored in the work area 332 in step S2405 of FIG. 11 is obtained, and a value of the flag 702 is determined to be "1", the CPU 201 determines that there is a reserved job. If a value of the flag 702 is determined to be "0", the CPU 201 determines that there is no reserved job (NO). If it is determined that there is no reserved job (NO in step S2501), the CPU 201 proceeds to step S2507, displays the normal operation screen in the operation unit, and then finishes the processing.

On the other hand, if it is determined in step S2501 that there is a reserved job (YES in step S2501), the CPU 201 proceeds to step S2502. In step S2502, the CPU 201 determines whether the reserved job is executable by comparing configuration information of a device stored in the NVRAM 211 with new configuration information obtained at the time of starting. The configuration information of the device stored in the NVRAM 211 is configuration information of the MFP 200 at the last start time of the MFP 200 (and while power is ON) The new configuration information obtained at the time of starting is configuration information of the MFP 200 at the current start time.

More specifically, the CPU 201 obtains, before the normal operation screen shown in FIG. 12 is displayed, the new configuration information at the time of starting from each module (e.g., SCANNER 213, PRINTER 212, or staple) of the MFP 200. The CPU 201 determines whether the obtained configuration information has not changed from that of the last start time (e.g., FIG. 5).

If it is determined that the configuration information of the MFP 200 has been changed, the CPU 201 determines whether a reserved job is executable by the new configuration of the MFP 200.

It is assumed, for example, that copying on A4 has been instructed by the paper key 710. In this case, it is presumed that a 1st paper size from the upper cassette is A4 at the last start time (e.g., paper 540 in FIG. 5) but it has been changed to a letter size at the time of newly starting the apparatus. Since there is no cassette having paper of an A4 size set thereon, the CPU 201 determines that execution of the reserved job is inhibited. The CPU 201 determines job executability by considering not only presence of the SCANNER 213 or the stapler that may have been changed but also information about consumables such as paper, toner, and staples. More specifically, the CPU 201 detects a remaining amount of consumables based on information of a remaining amount detection sensor or job execution history information. Upon determining that there is not an adequate remaining amount of consumables for job execution, the CPU 201 determines that the reserved job is non-executable.

On the other hand, if it is determined in step S2502 that the reserved job is executable (YES in step S2502), processing proceeds to step S2503, where the CPU 201 executes the reserved job.

More specifically, if it is determined that initialization of the SCANNER 213 has been finished, the CPU 201 starts document reading as to the reserved job. if it is determined that initialization of the PRINTER 212 has been finished, the CPU 201 starts data printing of the reserved job read by the SCANNER 213 according to job setting stored in the work area 332 of the RAM 203.

In step S2504, the CPU 201 determines whether the job executed in step S2503 has been normally finished. In this case, for example, if there is no longer an adequate amount of consumables such as one or more of paper, toner, and staples for job execution during execution of the job, the CPU 201 determines that the execution has not been completed.

For example, if it is determined that 100 copies of the reserved job have been specified (e.g., the number of copies 711) and remaining paper has become zero during the job execution, the CPU 201 cannot continue the job execution, so that the processing cannot be normally finished. In the case, it is determined that the job execution has not been completed (NO in step S2504), and the CPU 201 proceeds to step S2508.

If it is determined that the execution of the reserved job has been normally completed (YES in step S2504), the CPU 201 proceeds to step S2505. In step S2505, on the first and second simple operation screens 121 and 122, the CPU 201 determines whether the auto shutdown mode has been set. In step S2505, the CPU 201 obtains the auto shutdown flag 703 of the work area 332 stored in the RAM 203, and determines that the auto shutdown mode has been set if the flag 703 is "1".

If it is determined in step S2505 that the auto shutdown mode has been selected (YES in step S2505), processing proceeds to step S2506, where the CPU 201 executes shutdown processing for the MFP 200 and then finishes the processing.

An example of shutdown processing will be described below in detail.

On the other hand, if it is determined in step S2505 that the auto shutdown mode has not been selected (NO in step S2505), the CPU 201 proceeds to step S2507. In step S2507, the CPU 201 controls the operation unit to display the normal operation screen (e.g., FIG. 9) based on the configuration information at the time of new starting, and then finishes the processing.

If it is determined in step S2502 that the reserved job is non-executable (NO in step S2502), and/or in step S2504 that the execution of the reserved job has not been normally completed (NO in step S2504), the CPU 201 proceeds to step S2508.

In step S2508, the CPU 201 determines whether the auto shutdown mode has been set on the first and second simple operation screens 121 and 122. The CPU 201 may make this determination based on processing similar to step S2505.

If it is determined in step S2508 that the auto shutdown mode has been selected (YES in step S2508), processing proceeds to step S2509, where the CPU 201 determines whether an error content is printable. For example, the CPU 201 may check a remaining paper and toner amount to determine whether the error content is printable.

If it is determined in step S2509 that the error content is printable (YES in step S2509), the process proceeds to step S2510 where the CPU 201 prints the error content similar to that shown in FIG. 14 by using the PRINTER 212, and then processing proceeds to step S2506. FIG. 14 is a schematic diagram illustrating an example of the printed error content output from the PRINTER 212 shown in FIG. 1 during the reserved job execution.

As the error content, as shown in the example of FIG. 14, one or more of a reserved job execution result 901, a reserved job setting content 902, and a detailed error content 903 may be printed. The error content may have a job ID added to the print. The error content may be printed by adding other pieces of information, or notification of the printing may be transmitted to a registered user at user's mail address.

In step S2506, the CPU 201 carries out shutdown processing to shut down the power of the MFP 200, and finishes the processing. An example of shutdown processing will be described below.

If it is determined in step S2508 that the auto shutdown mode has not been selected (NO in step S2508), and/or in step S2509 that printing of the error content is inhibited (NO in step S2509), the CPU 201 proceeds to step S2511. The user can accordingly be notified of the error content. If it is determined in step S2508 that the auto shutdown mode has not been selected and/or in step S2509 that the printing of the error content is inhibited, the CPU 201 may also proceed to step S2506. In this case, the CPU 201 can shut down the MFP

200 in priority to notification of the error content. When the MFP 200 is shut down by this method, the CPU 201 may store the error content in the HDD 210, and perform control to cause the operation unit to display the error content stored in the HDD 210 at the next time when starting power supply. Thus, for example, even when the user reserves a job in the MFP 200 and then moves away from the MFP 200, the user can fairly reliably shut down power of the MFP 200, and know the error content when he comes back to the MFP 200.

Figure 15:
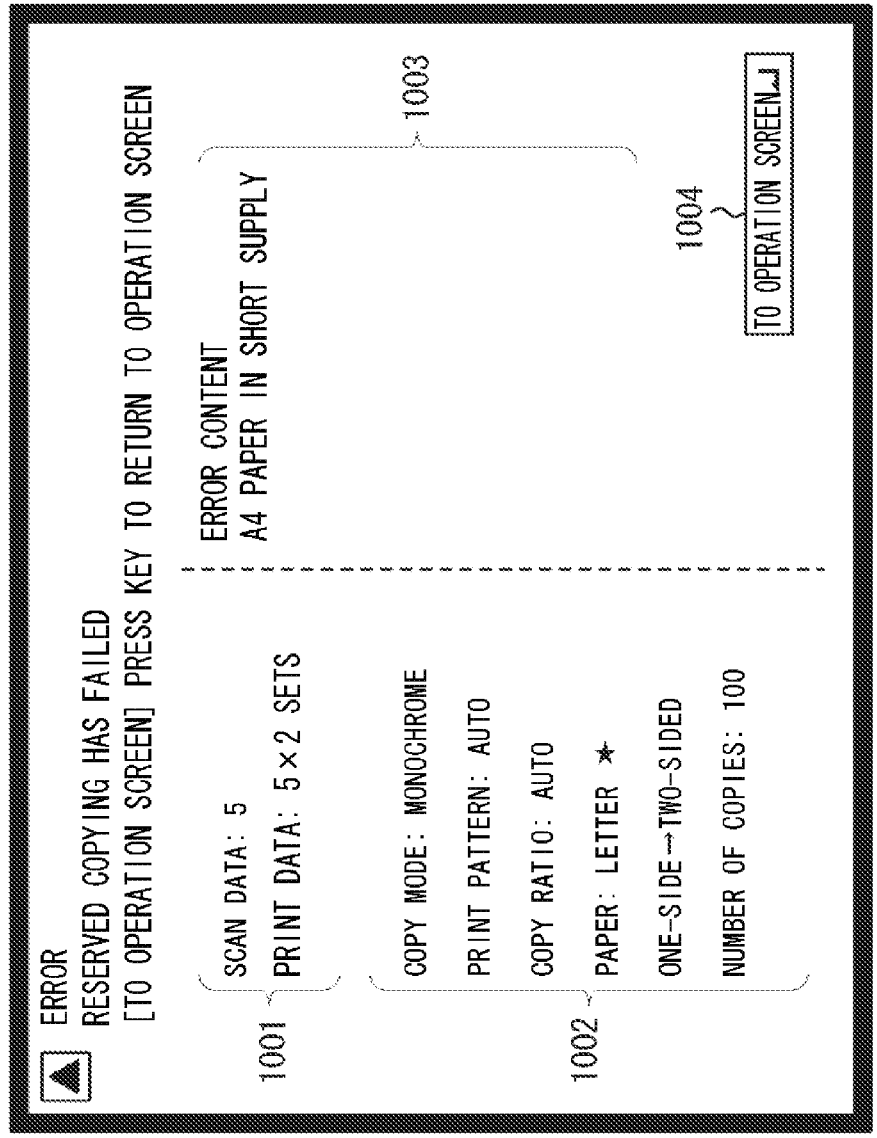
FIG. 15 is a schematic diagram illustrating an example of an error made at the time of executing a reserved job displayed in the operation unit shown in FIG. 1.

In step S2511, as shown in the example of FIG. 15, the CPU 201 causes the operation unit to display the error content. The error content to be displayed may be similar to that of print data printed in step S2510. As the error content, one or more of a reserved job execution result 1001, a reserved job setting content 1002, and a detailed error content 1003 may be displayed. FIG. 15 is a schematic diagram illustrating an example of display of an error content that occurred at the time of executing the reserved job, in the operation unit shown in FIG. 1. In FIG. 15, the CPU 201 displays, as an error content, a reserved job execution result 1001, a reserved job setting content 1002, and a detailed error content 1003. The error content may also have a job ID added to the display. A return button 1004 for returning from the error display screen to the normal operation screen 123 may be pressed by the user.

The user touches the button 1004 for returning to the operation screen after checking the error content, then the proceeding advances to step S2512.

In step S2512, the CPU 201 causes the operation unit to display the normal operation screen (e.g., FIG. 12), which is displayed based on the configuration information at the new start time, and then finishes the processing.

Figure 16:
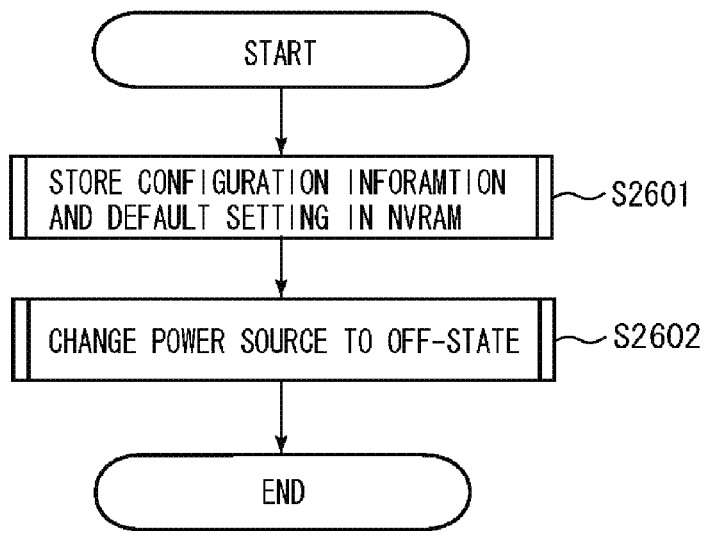
FIG. 16 is a flowchart illustrating an example of data processing in the MFP of the exemplary embodiment.

FIG. 16 is a flowchart illustrating an example of shutdown processing in the MFP 200 according to the exemplary embodiment. Steps S2601 and S2602 may be realized when the CPU 201 loads the program from the ROM 202 or the HDD 210 to the RAM 203 to execute it.

In the example of shutdown processing, first, in step S2601, the CPU 201 carries out the following processing before it causes the operation unit to display the normal screen shown in FIG. 11 (YES in step S2404). More specifically, the CPU 201 stores new configuration information of the start time obtained from each unit of the MFP 200 and an initial value of a function set by the user, in the NVRAM 211 (e.g, FIG. 5).

In step S2602, the CPU 201 changes the power of the MFP 200 to an OFF state and finishes the processing.

As described above, the CPU 201 controls the operation unit to display the first simple operation screen 121 of the text base when the boot program 101 stored in the ROM 202 is started. Thus, the user can carry out a reserved job within a relatively short time after the MFP 200 is turned ON.

More specifically, time from the power-ON to the operable state set by using the operation unit may be shortened more than the conventional panel display control by the difference time 124 as shown in the example of FIG. 2.

The user can set the job and reserve its entry including a copy job immediately after the power of the main body is turned ON to start the boot program. Thus, according to the exemplary embodiment, job setting can be received via the job setting screen, thereby reduce the wait of user as much as possible from when the MFP 200 is started. Aspects of the present embodiment thus allow for a job processing apparatus capable of receiving setting of jobs via a job setting screen while inhibiting and/or preventing a user from waiting as much as possible when the apparatus is started, and a method for controlling the job processing apparatus.

Further, in the auto shutdown mode, after the user has reserved the jobs, the power of the MFP 200 can be automatically shifted to an OFF state after job processing without waiting for completion of job execution. Accordingly, for example, even when the user enters the job to the MFP 200 and then moves away from the MFP 200, the MFP 200 can be automatically shut down, and thus convenience can be improved. For example, in an environment such as small-office-home-office (SOHO), for a user who shifts the power of the MFP 200 to an OFF state when the apparatus is not used, stress caused by standing-by until the apparatus can be operated may be reduced. Since the user can turn ON the power of the MFP 200, and set and reserve jobs, a power saving effect can be improved.

Even if there is no knowing when the user who has moved away from the MFP will come back, the power of the MFP 200 may be ON only while the job is executed. Thus, wasteful consumption of power may be prevented.

The exemplary embodiment has been described by using the names of the first and second simple operation screens 121 and 122 and the normal operation screen 123. However, the names of the screens are in no way limited. For example, each of the first and second simple operation screens 121 and 122 may be a screen shown in FIG. 7, and can be named a first job setting screen. In connection with the first job setting screen, the normal operation screen 123 can be named a second setting screen. The exemplary embodiment has been described using the names of the boot program that starts the MFP 200 and the control program that is started after the start of the boot program. However, the names of the programs are also in no way limited. For example, the boot program (e.g., first program) may have a name other than the boot program as long as it is a program used for starting the MFP 200. The control program (e.g., second program with respect to the first program) may have a name other than the control program. The exemplary embodiment has been described by way of the MFP 200 as an example. However, the present invention is not limited to the MFP 200 but can also be applied to a single function printer (SFP) or another apparatus for processing jobs.

Figure 17:
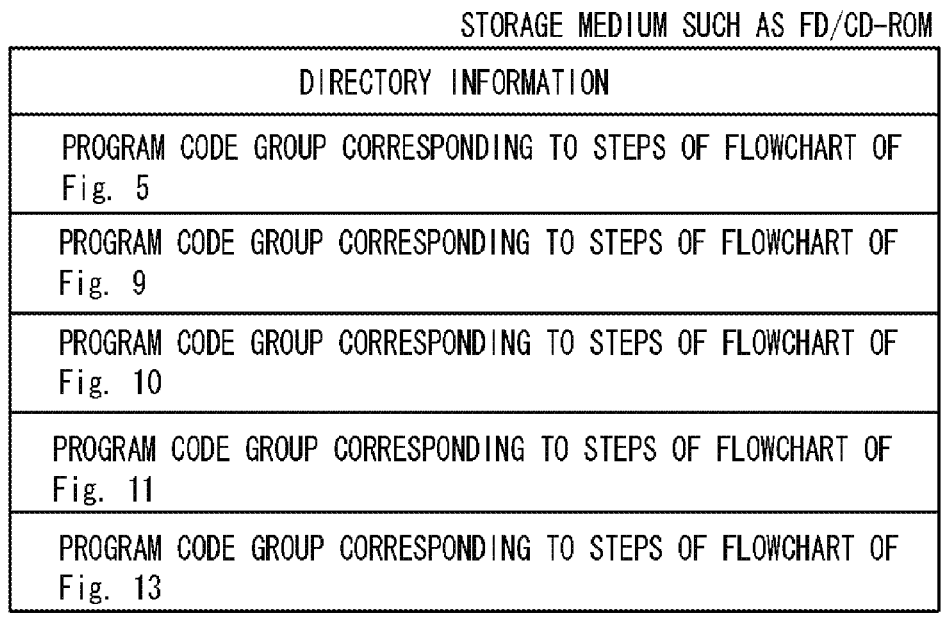
FIG. 17 illustrates an example of a memory map of a storage medium for storing various data processing programs readable by the MFP of the present invention.

Next, referring to the example of a memory map as shown in FIG. 17, a configuration of a data processing program and/or computer-executable instructions readable by the image processing apparatus of the present invention will be described.

FIG. 17 illustrates an example of a memory map of a storage medium for storing one or more of various data processing programs and computer-executable instructions readable by a computer of the MFP 200 of the present invention.

Information for managing a program group stored in the storage medium, such as version information or a creator, is stored. Information dependent on an OS of a program reading side such as an icon for identifying and displaying a program may also be stored.

Data subordinate to various programs and/or computer-executable instructions may be managed in a directory. When a program for installing various programs in the computer or a program to be installed is compressed, a program for decompression may be stored.

The function shown in the flowchart of the exemplary embodiment may be executed by a host computer based on a program and/or computer-executable instructions installed from the outside. In this case, aspects of the present invention may be applied even when an information group including programs and/or computer-executable instructions is supplied to an output apparatus from a storage medium such as a CD-ROM, a flash memory, or a FD, or an external storage medium via a network.

As described above, the storage medium recording at least one of computer-executable instructions and a software program code for realizing a function according to the exemplary embodiment may be supplied to the system or the apparatus. Then, the computer (or CPU or MPU) of the system or the apparatus may read and execute the program code and/or computer-executable instructions stored in the computer-readable storage medium. According to this, embodiments of the present invention can be achieved.

In this case, the program code and/or computer-executable instructions read from the storage medium realizes a new function of the present invention itself, and the storage medium storing the program code is within the invention.

Thus, as long as functions according to aspects of the invention are provided, any program form and/or computer-executable instructions such as an object code, a program realized by an interpreter or script data supplied to the OS, can be employed.

As the storage medium for supplying the program, for example, at least one of a flexible disk, a hard disk, an optical disk, a magneto-optical disk, a MO, a CD-ROM, a CD-R, and a CD-RW may be provided. One or more of a magnetic tape, a nonvolatile memory card, a ROM, and a DVD can also be used.

In this case, the program code and/or computer-executable instructions read from the storage medium may realize functions according to the exemplary embodiment, and the storage medium storing the program code and/or computer-executable instructions may be within the scope of the present invention.

According to a program and/or computer-executable instructions supplying method, a browser of a client computer may be used to access a homepage of Internet. A computer program itself and/or the computer-executable instructions according to the present invention, or a compressed file containing an auto install function can be downloaded from the homepage. The program code and/or computer-executable instructions may be divided into a plurality of files, and files may be downloaded from different homepages. In other words, a WWW server or an ftp server for enabling a plurality of users to download the program and/or computer-executable instructions file for realizing the processing according to aspects of the invention may be included in an embodiment of the invention.

The program and/or computer-executable instructions according to an aspect of the present invention may also be encrypted, and stored in a storage medium such as a CD-ROM to be distributed to users. A user who has satisfied predetermined conditions may be permitted to download key information for decrypting the program and/or computer-executable instructions from the homepage via the Internet. Then, the encrypted program and/or computer-executable instructions may be executed to be installed in the computer by using the key information. Thus, functions according to aspects of the invention may be realized.

Not only the program code and/or computer-executable instructions that are read and executed by the computer realize the function of the exemplary embodiment, but based on an instruction of the program code, the operating system (OS) operating on the computer may carry out a part or all part of actual processing and may realize functions of the exemplary embodiment of the present invention.

The program code and/or computer-executable instructions read from the storage medium may be written in a memory of a function expansion board inserted into the computer or a function expansion unit connected to the computer. Then, based on the instruction of the program code, a CPU included in the function expansion board or the function expansion unit can carry out a part or all parts of actual processing and realize functions according to the exemplary embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-100325 filed Apr. 8, 2008, which is hereby incorporated by reference herein in its entirety.

What is claimed is:

1. A printing apparatus comprising:
  a memory that stores information indicating a first configuration of the printing apparatus, wherein the information is stored in the memory before power is turned on for the printing apparatus;
  a display; and
  a processor that operates to:
  (i) execute one or more programs including a boot program stored in a boot ROM; and
  (ii) cause the display to display a first print job setting screen, by the execution of the boot program by the processor, for receiving a setting of a printing to be executed, based on the information indicating the first configuration of the printing apparatus stored in the memory, after the power is turned on and before startup of an operating system is completed by the processor, wherein the processor starts the operating system and a hard disk drive ("HDD") or another storage device via the execution of the boot program,
  wherein a control program read out from the HDD or the other storage device obtains information indicating a second configuration of the printing apparatus after the first print job setting screen is displayed in or on the display, the second configuration being different from or the same as the first configuration depending on the obtained information,
  wherein the processor further operates to execute the control program stored in the HDD or the other storage device and to cause the display to display, after the control program obtains the information indicating the second configuration of the printing apparatus, a second print job setting screen, by the execution of the control program by the processor, for receiving a setting of the printing to be executed, based on the information obtained by the control program,
  wherein the second print job setting screen has taken over the setting of the printing received via the first print job setting screen,
  wherein, after the startup of the operating system, the processor further operates to at least one of: (i) display a third print job setting screen in or on the display; and (ii) switch to the third print job setting screen from the second print job setting screen or to not switch to the third print job setting screen based on switching status information received by the processor, and
  wherein the third print job setting screen has taken over the setting of the printing received via the first and second print job setting screens.

2. The printing apparatus according to claim 1, wherein the printing is processed based on the setting of the printing received via the first print job setting screen and a further setting of the printing received via the second print job setting screen.

3. The printing apparatus according to claim 1,
wherein the processor further operates to, when an execution reservation of a printing is received via the first print job setting screen, at least one of: (i) reserve a job based on the execution reservation and/or execute the reserved job; and (ii) perform control to execute the printing whose execution reservation has been received based on the setting of the printing received via the first print job setting screen.

4. The printing apparatus according to claim 3, wherein the execution of the control program initializes each module of the printing apparatus for starting and/or operating the printing apparatus, and
wherein the processor executes the reserved job when: (i) the initialization of each module of the printing apparatus is completed, and (ii) the control program obtains the information indicating the second configuration.

5. The printing apparatus according to claim 4, wherein at least one of: (i) after the job reservation and/or after the reserved job is executed, the processor further operates to automatically shut down the printing apparatus in response to receiving an instruction for shutting down power of the printing apparatus; and (ii) the processor further operates to receive the instruction for shutting down power of the printing apparatus only after receiving the execution reservation.

6. The printing apparatus according to claim 5, wherein, when the job reservation is executed but the reserved job is not executable, the processor further operates to:
(i) determine whether error content indicating that the reserved job is not executable is printable or not and determine whether the instruction for shutting down power of the printing apparatus has been received or not; and
(ii) if the processor determines that the error content is printable, print or display the error content, or if the processor determines that the error content is printable and that the instruction for shutting down power of the printing apparatus has been received, print or display the error content before the printing apparatus is shut down; or
if the processor determines that the error content is not printable and that the instruction for shutting down power of the printing apparatus has been received, store the error content and print or display the error content after the printing apparatus is restarted or powered on.

7. The printing apparatus according to claim 1, wherein the processor further operates to shut down, when an instruction for shutting down power of the printing apparatus is received via the first print job setting screen, the power of the printing apparatus.

8. The printing apparatus according to claim 1, wherein the operating system carries out all processing for the printing apparatus after the startup of the operating system is completed.

9. The printing apparatus according to claim 1, wherein the processor further operates to determine whether the first configuration and the second configuration are the same or different, and wherein the execution of the control program initializes each module of the printing apparatus for starting and/or operating the printing apparatus.

10. The printing apparatus according to claim 1, wherein the first print job setting screen is displayed to set one or more jobs without waiting for completion of the startup of the HDD or the other storage device.

11. The printing apparatus according to claim 1, wherein the processor further operates to:
display the first and second print job setting screens on a text basis so that (i) processing for the displaying of the first and second print job setting screens is reduced, and (ii) a time until the first print job setting screen is displayed and a time until the second print job setting screen is displayed are reduced or shortened; and
display the third print job setting screen using a high-level user interface and/or using one or more graphics in addition to text.

12. The printing apparatus according to claim 1, wherein the processor further operates to determine whether storage preparation or the startup of the HDD or the other storage device is completed, and, while the storage preparation or the startup of the HDD or the other storage device is not completed, to update the first print job setting screen to display new data input while the first print job setting screen is displayed.

13. The printing apparatus according to claim 12, wherein the processor further operates to determine whether loading of the control program is completed, and while the loading of the control program is not completed, to update the first print job setting screen to display new data input while the first print job setting screen is displayed.

14. A method for controlling a printing apparatus, the method comprising:
storing information indicating a first configuration of the printing apparatus in a memory of the printing apparatus, wherein the information is stored in the memory before power is turned on for the printing apparatus; and
displaying a first print job setting screen, by execution, via a processor of the printing apparatus, of a boot program stored in a boot ROM, for receiving a setting of a printing to be executed, based on the stored information indicating the first configuration of the printing apparatus, after power is turned on and before startup of an operating system is completed by the processor, wherein the processor starts the operating system and a hard disk drive ("HDD") or another storage device via the execution of the boot program,
wherein a control program read out from the HDD or the other storage device obtains information indicating a second configuration of the printing apparatus after the first print job setting screen is displayed, the second configuration being different from or the same as the first configuration depending on the obtained information,
wherein after the information indicating the second configuration of the printing apparatus is obtained by the control program, a second print job setting screen is displayed, by execution, via the processor, of the control program stored in the HDD or the other storage device, for receiving a setting of the printing to be executed, based on the information obtained by the control program,
wherein the second print job setting screen has taken over the setting of the printing received via the first print job setting screen,
wherein, after the startup of the operating system, at least one of: a third print job setting screen is displayed; and the third print job setting screen is or is not switched from the second print job setting screen based on switching status information received by the processor, and
wherein the third print job setting screen has taken over the setting of the printing received via the first and second print job setting screens.

15. The method for controlling the printing apparatus according to claim 14, wherein the printing apparatus processes the printing based on the setting of the printing received via the first print job setting screen and a further setting of the printing received via the second print job setting screen.

16. The method for controlling the printing apparatus according to claim 14, the method further comprising:
receiving an execution reservation of a printing via the first print job setting screen; and
performing, when the execution reservation of the printing is received, via the processor, at least one of: (i) reservation of a job based on the execution reservation and/or execution of the reserved job; and (ii) control to execute the printing whose execution reservation has been received based on the setting of the printing received via the first print job setting screen.

17. The method for controlling the printing apparatus according to claim 16, wherein the execution of the control program initializes each module of the printing apparatus for starting and/or operating the printing apparatus, and
wherein the processor executes the reserved job when: (i) the initialization of each module of the printing apparatus is completed, and (ii) the control program obtains the information indicating the second configuration.

18. The method for controlling the printing apparatus according to claim 17, wherein at least one of: (i) after the job reservation and/or after the reserved job is executed, the printing apparatus is automatically shut down in response to receiving an instruction for shutting down power of the printing apparatus; and (ii) the instruction for shutting down power of the printing apparatus is receivable only after receiving the execution reservation.

19. The method for controlling the printing apparatus according to claim 18, further comprising:
when the job reservation is executed but the reserved job is not executable, determining whether error content indicating that the reserved job is not executable is printable or not and determining whether the instruction for shutting down power of the printing apparatus has been received or not; and
if the error content is determined to be printable, printing or displaying the error content, or if the error content is determined to be printable and the instruction for shutting down power of the printing apparatus is determined to have been received, printing or displaying the error content before the printing apparatus is shut down; or
if the error content is determined to not be printable and the instruction for shutting down power of the printing apparatus is determined to have been received, storing the error content and printing or displaying the error content after the printing apparatus is restarted or powered on.

20. The method for controlling the printing apparatus according to claim 14, the method further comprising:
receiving an instruction for shutting down power of the printing apparatus via the first print job setting screen; and
shutting down, when shutting-down of the power of the printing apparatus is instructed, via the processor, the power of the printing apparatus.

21. The method for controlling the printing apparatus according to claim 14, wherein the operating system carries out all processing for the printing apparatus after the startup of the operating system is completed.

22. The method for controlling the printing apparatus according to claim 14, further comprising determining whether the first configuration and the second configuration are the same or different, and initializing, via the execution of the control program, each module of the printing apparatus for starting and/or operating the printing apparatus.

23. The method for controlling the printing apparatus according to claim 14, wherein the first print job setting screen is displayed to set one or more jobs without waiting for completion of the startup of the HDD or the other storage device.

24. The method for controlling the printing apparatus according to claim 14, further comprising:
displaying the first and second print job setting screens on a text basis so that (i) processing for the displaying of the first and second print job setting screens is reduced, and (ii) a time until the first print job setting screen is displayed and a time until the second print job setting screen is displayed are reduced or shortened; and
displaying the third print job setting screen using a high-level user interface and/or using one or more graphics in addition to text.

25. The method for controlling the printing apparatus according to claim 14, further comprising:
determining whether storage preparation or the startup of the HDD or the other storage device is completed; and
while the storage preparation or the startup of the HDD or the other storage device is not completed, updating the first print job setting screen to reflect new data input while the first print job setting screen is displayed.

26. The method for controlling the printing apparatus according to claim 25, further comprising:
determining whether loading of the control program is completed; and
while the loading of the control program is not completed, updating the first print job setting screen to display new data input while the first print job setting screen is displayed.

27. A non-transitory computer readable recording medium having computer-executable instructions stored thereon for controlling a printing apparatus, the computer readable recording medium including:
computer-executable instructions for storing information indicating a first configuration of the printing apparatus in the storing before power is turned on for the printing apparatus;
computer-executable instructions for displaying a first print job setting screen, by execution, via a processor of the printing apparatus, of a boot program stored in a boot ROM, for receiving a setting of a printing to be executed, based on the stored information indicating the first configuration of the printing apparatus, after power is turned on and before startup of an operating system is completed by the processor, wherein the processor starts the operating system and a hard disk drive ("HDD") or another storage device via the execution of the boot program;
computer-executable instructions for a control program read out from the HDD or the other storage device to obtain information indicating a second configuration of the printing apparatus after the first print job setting screen is displayed in the displaying, the second configuration being different from or the same as the first configuration depending on the obtained information; and
computer-executable instructions for displaying, after the information indicating the second configuration of the printing apparatus is obtained, a second print job setting screen, by execution, via the processor, of the control program stored in the HDD or the other storage device, for receiving a setting of the printing to be executed, based on the information obtained by the control program, wherein the second print job setting screen has taken over the setting of the printing received via the first print job setting screen, wherein, after the startup of the operating system, at least one of: a third print job setting screen is displayed; and the third print job setting screen is or is not switched from the second print job setting screen based on switching status information received by the processor, and wherein the third print job setting screen has taken over the setting of the printing received via the first and second print job setting screens.

\* \* \* \* \*